United States Patent [19]
Pon

[11] Patent Number: 6,130,908
[45] Date of Patent: *Oct. 10, 2000

[54] CODE MULTIPATH ANALYZER USING WEIGHTED OR MODIFIED CORRELATIONS

[75] Inventor: Rayman W. Pon, Cupertino, Calif.

[73] Assignee: Trimble Navigation Limited, Sunnyvale, Calif.

[*] Notice: This patent is subject to a terminal disclaimer.

[21] Appl. No.: 08/962,337

[22] Filed: Oct. 31, 1997

[51] Int. Cl.[7] ................................................ H04B 3/46
[52] U.S. Cl. ................................ 375/227; 375/346
[58] Field of Search .................................. 375/346, 227, 375/208; 370/209

[56] References Cited

U.S. PATENT DOCUMENTS

| | | | |
|---|---|---|---|
| 5,218,619 | 6/1993 | Dent | 370/209 |
| 5,410,750 | 4/1995 | Cantwell et al. | 455/306 |
| 5,495,499 | 2/1996 | Fenton et al. | 375/208 |
| 5,917,866 | 6/1999 | Pon | 375/208 |
| 5,949,815 | 9/1999 | Pon | 375/346 |

*Primary Examiner*—Temesghen Ghebretinsae
*Assistant Examiner*—Kevin M Burd
*Attorney, Agent, or Firm*—Boris G. Tankhilevich

[57] ABSTRACT

The apparatus and the method for analyzing the code multipath satellite disturbance are disclosed. The apparatus includes the tracking channel and the analyzing circuit. The tracking channel can include the weighted or modified weighting functions to decrease the level of the multipath reference signal. The analyzing circuit can include a plurality of additional correlator circuits used to build the filter function that is utilized to analyze the incoming code multipath disturbance.

28 Claims, 17 Drawing Sheets

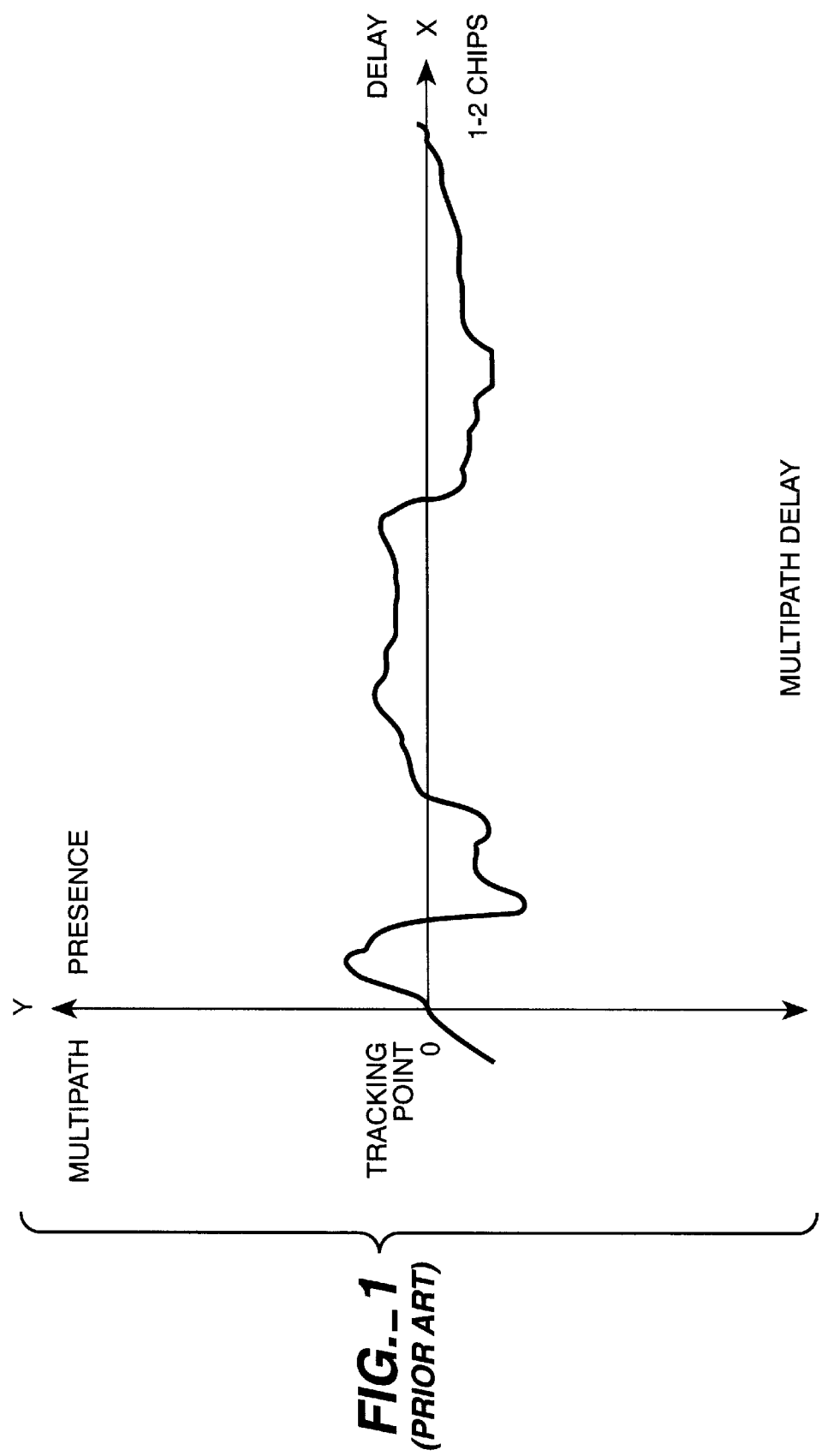
FIG._1 (PRIOR ART)

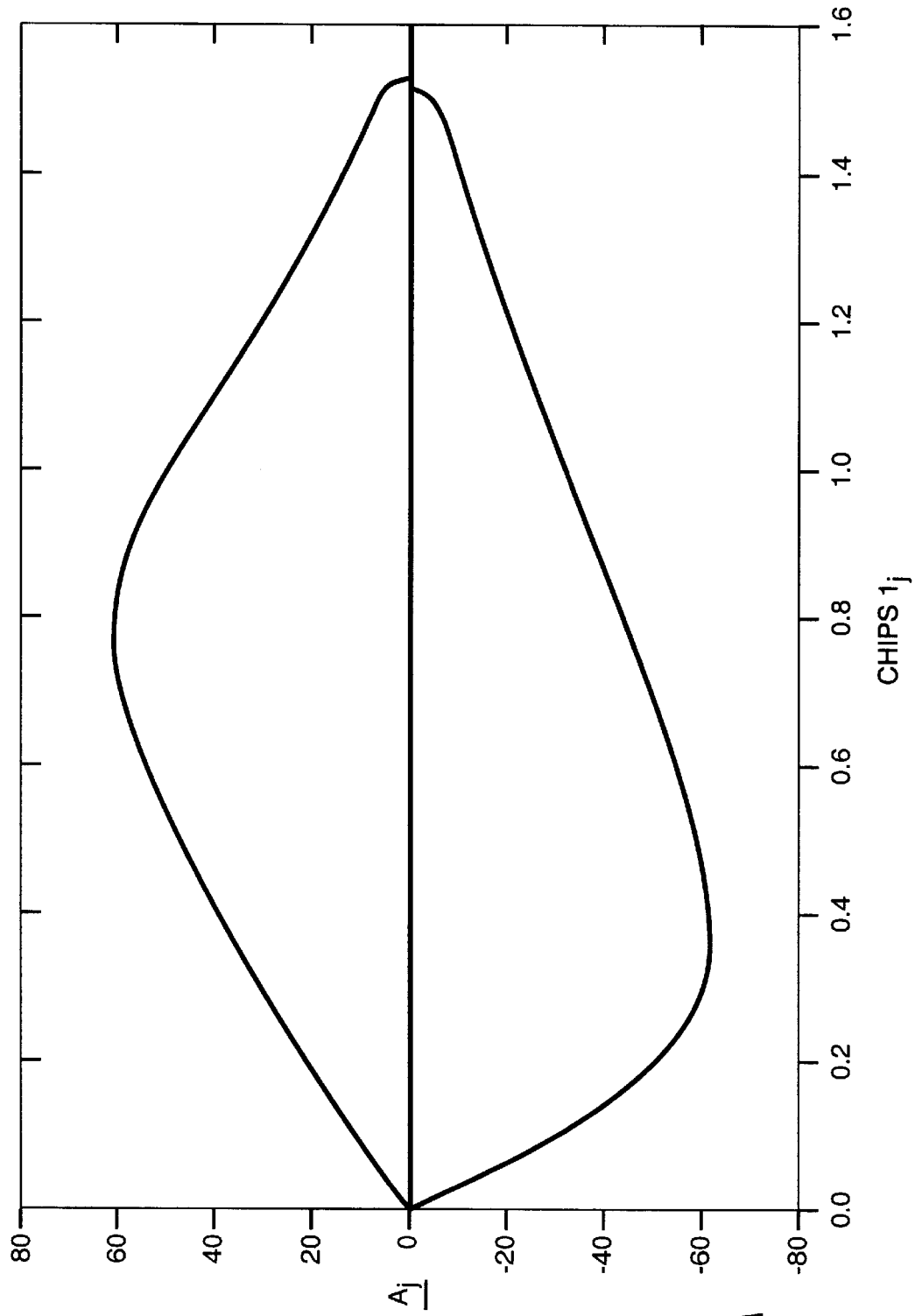
FIG._1A
(PRIOR ART)

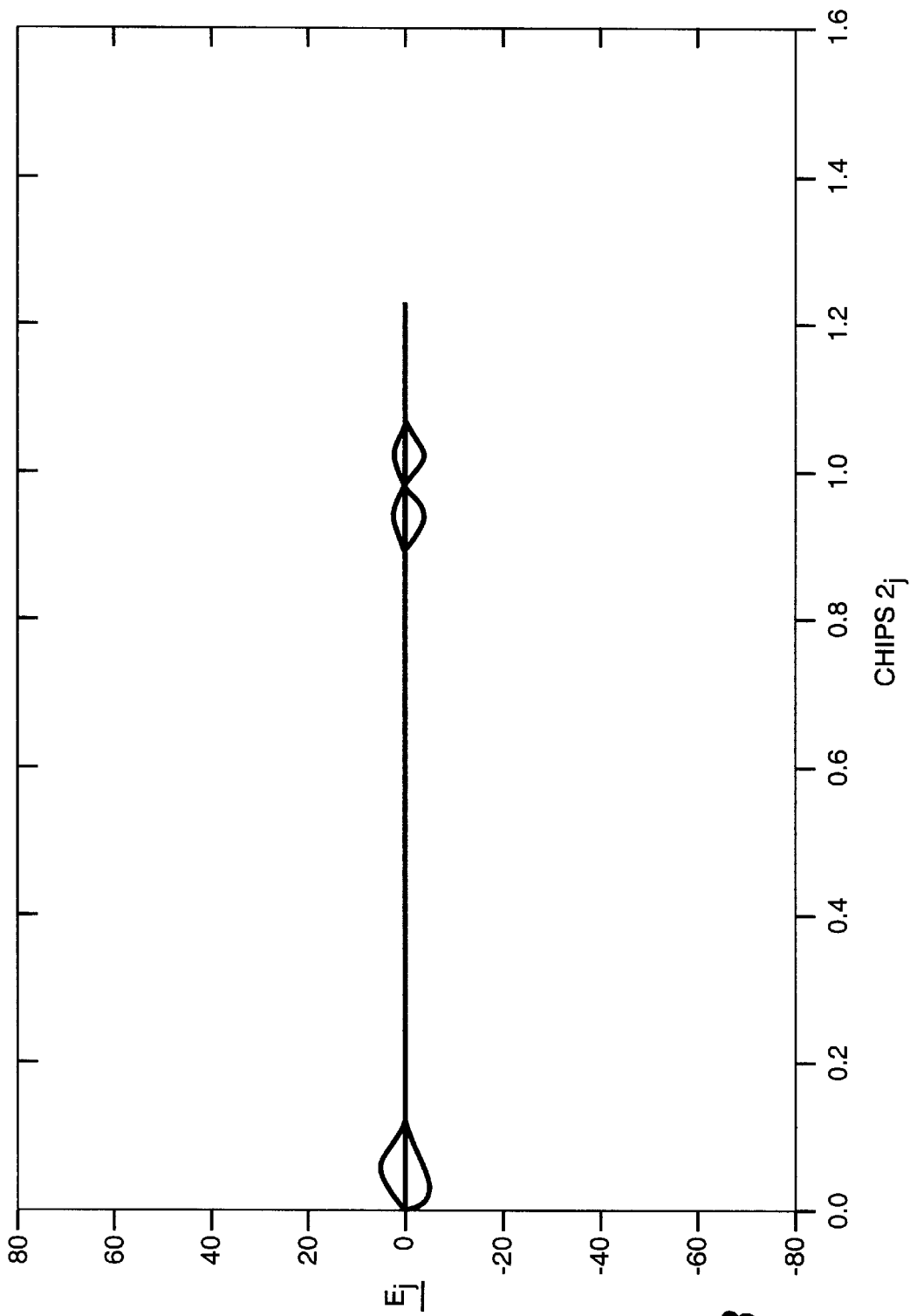
FIG._1B
*(PRIOR ART)*

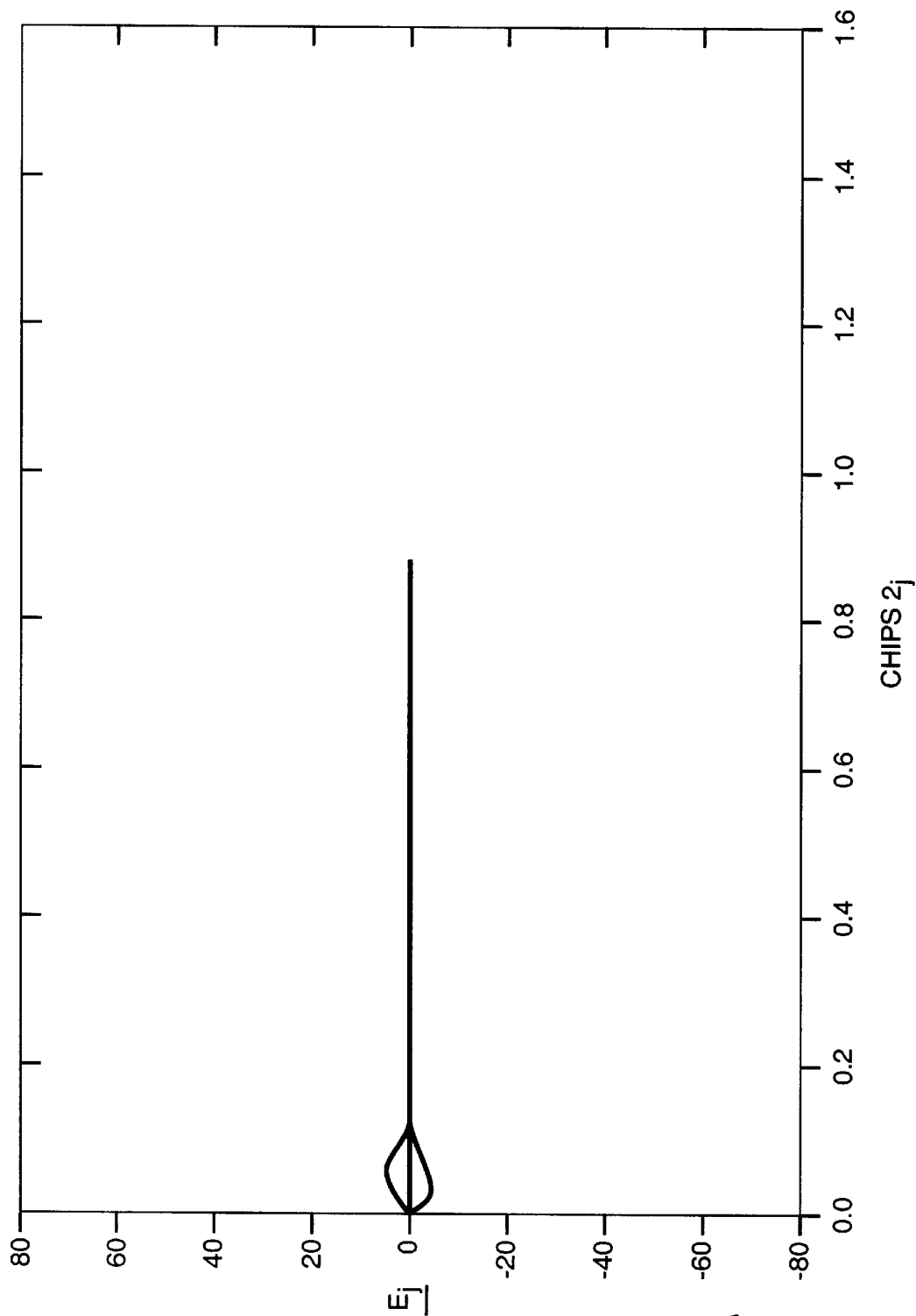
FIG._1C
(PRIOR ART)

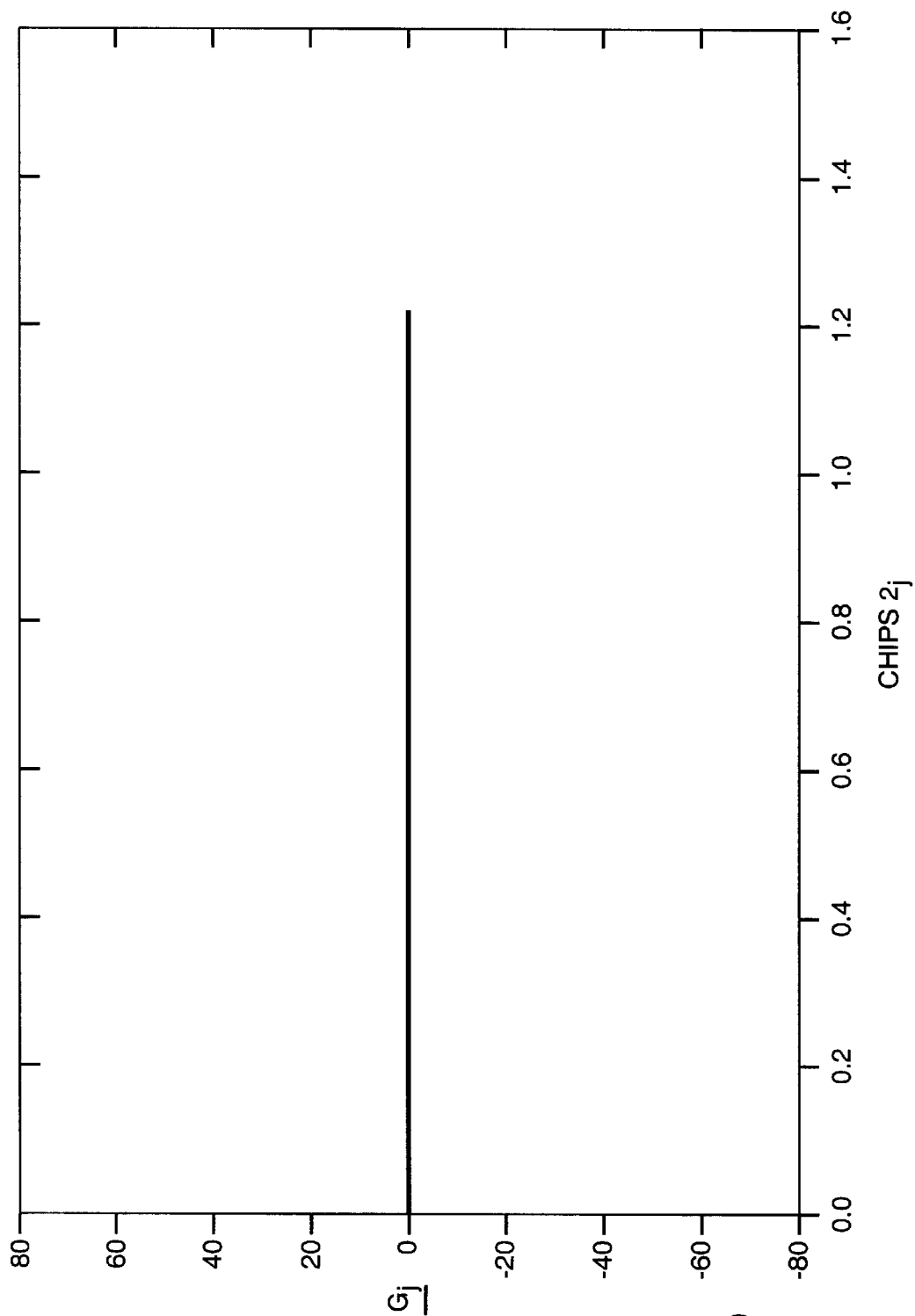
FIG._1D
*(PRIOR ART)*

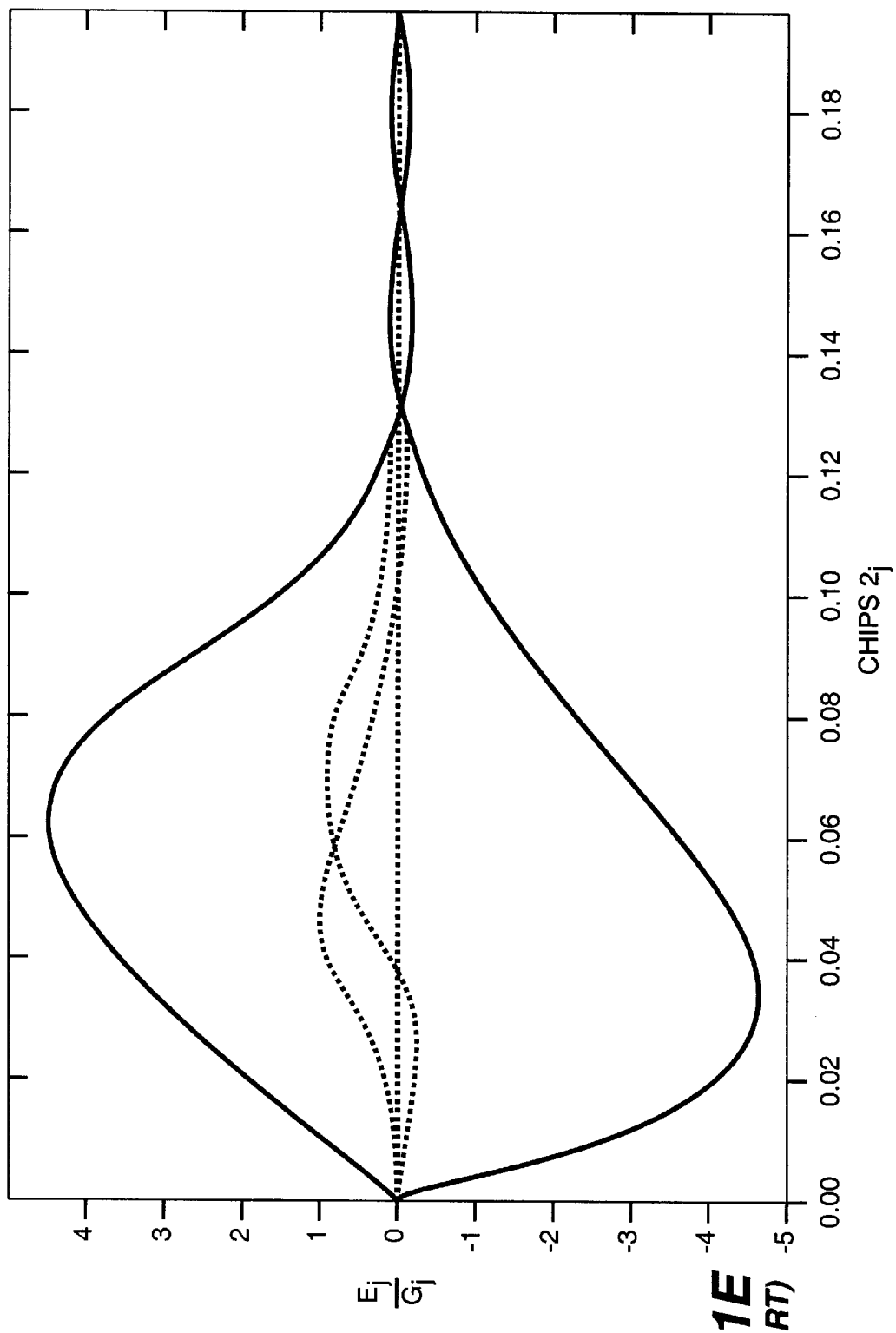
FIG._1E
*(PRIOR ART)*

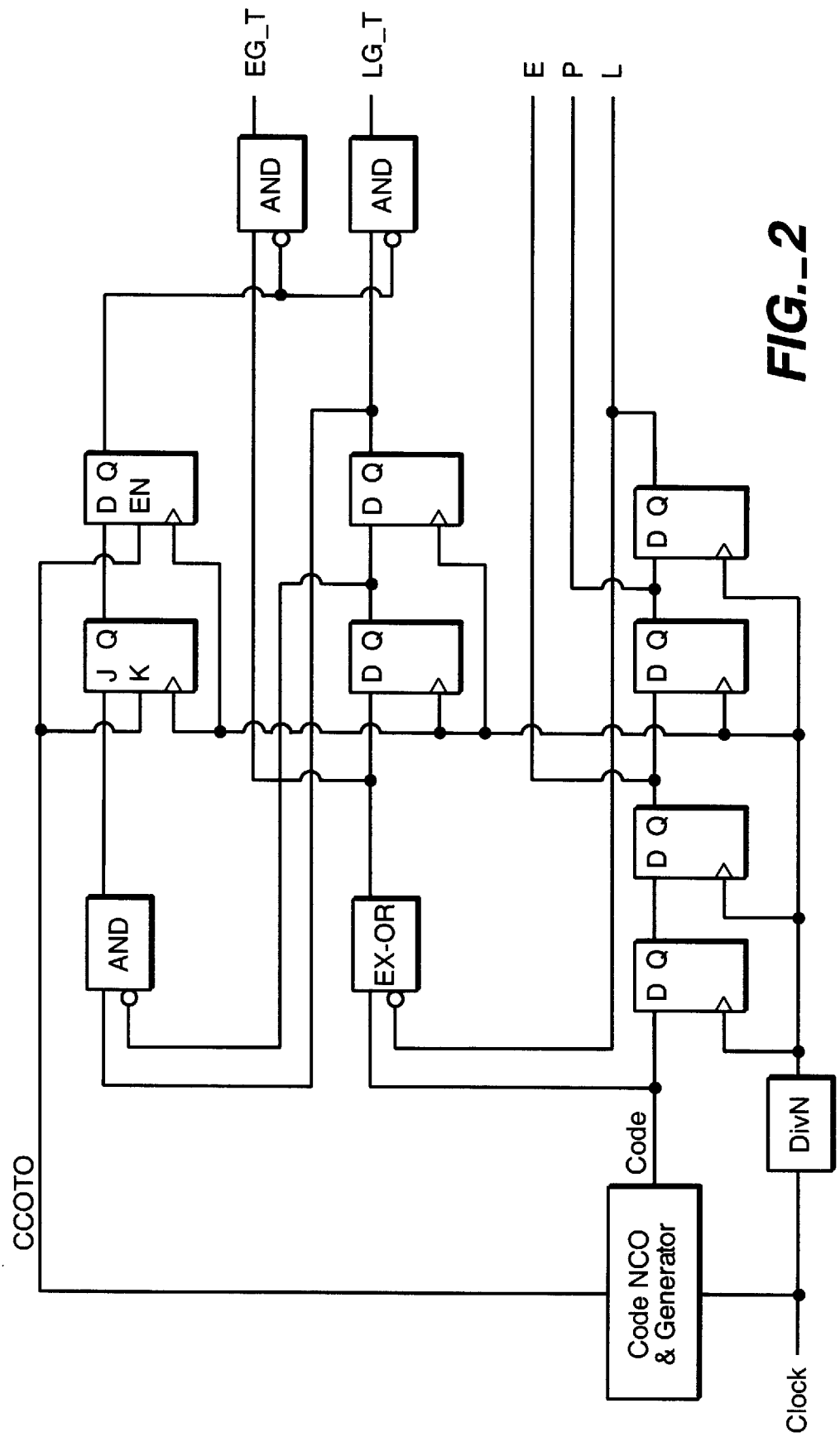
FIG._2

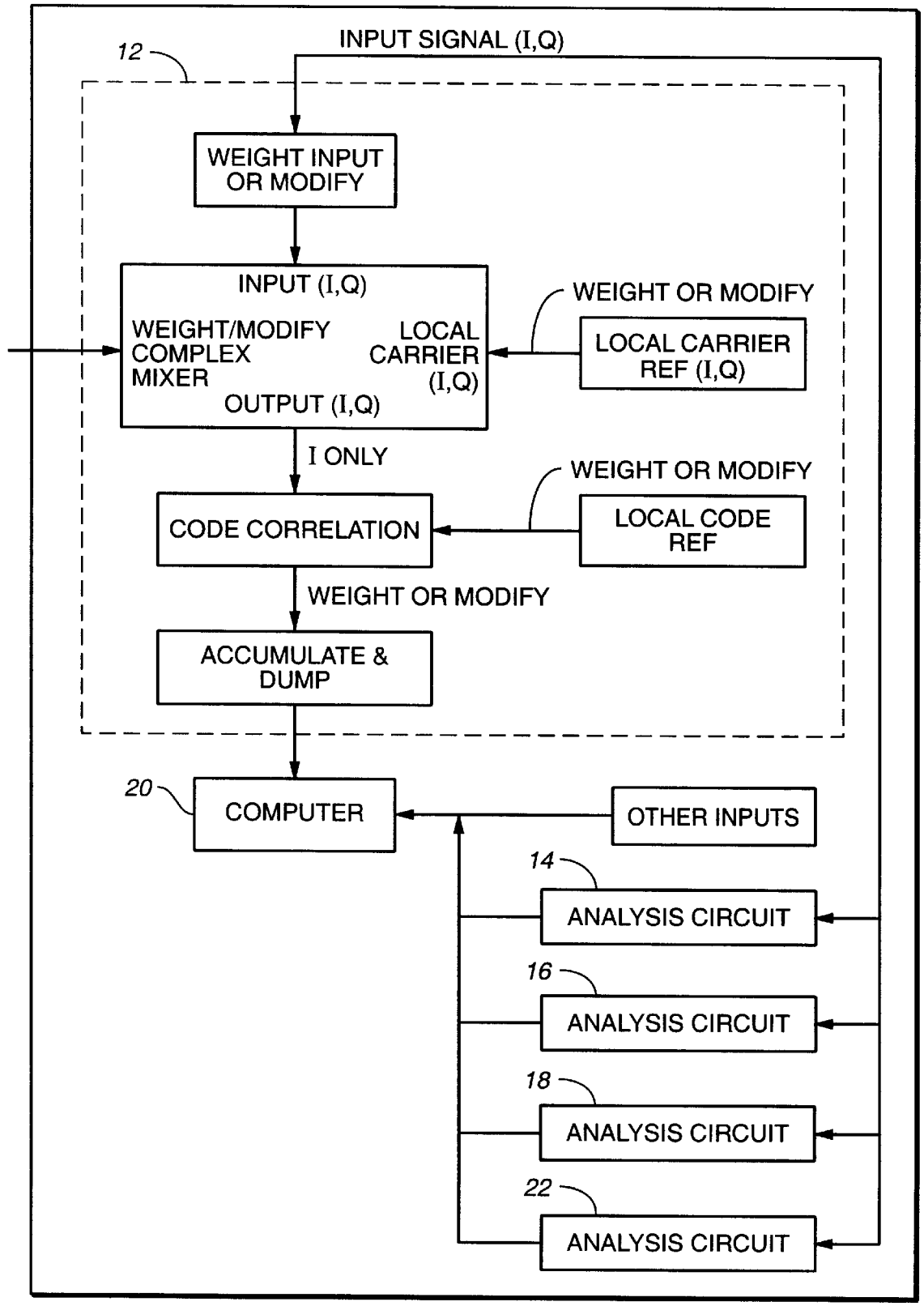
FIG._3

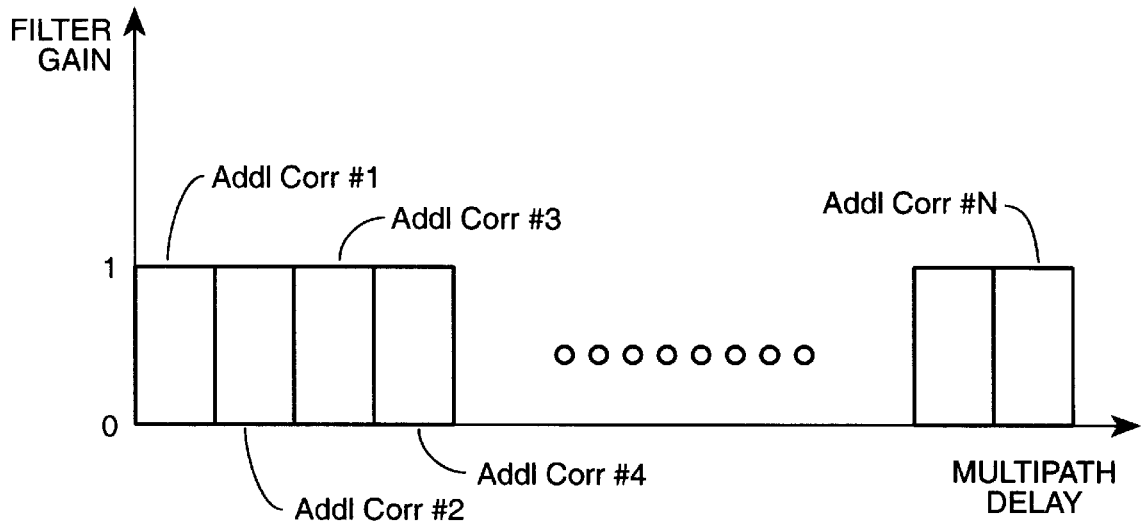
FIG._4A
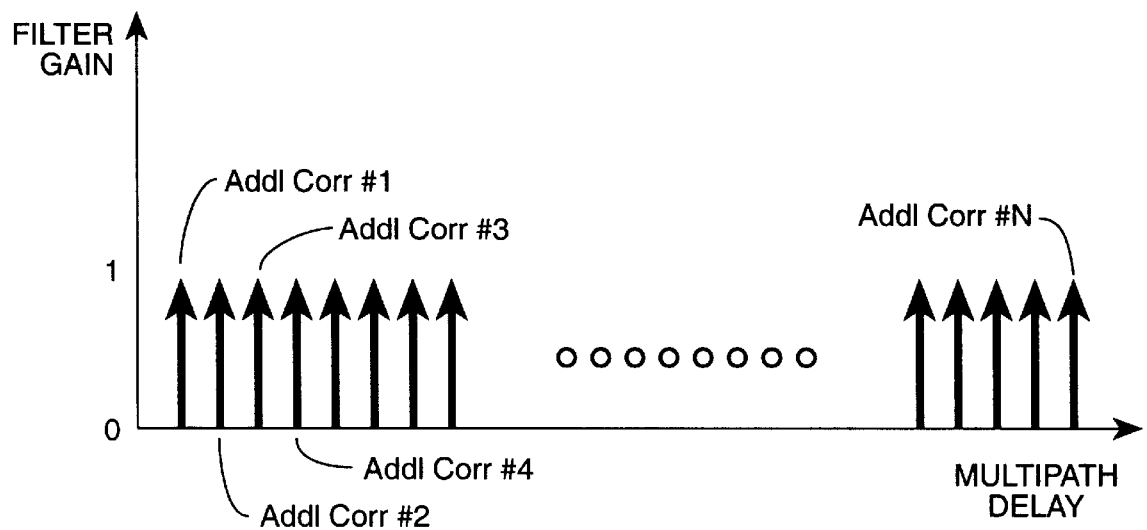
FIG._4B

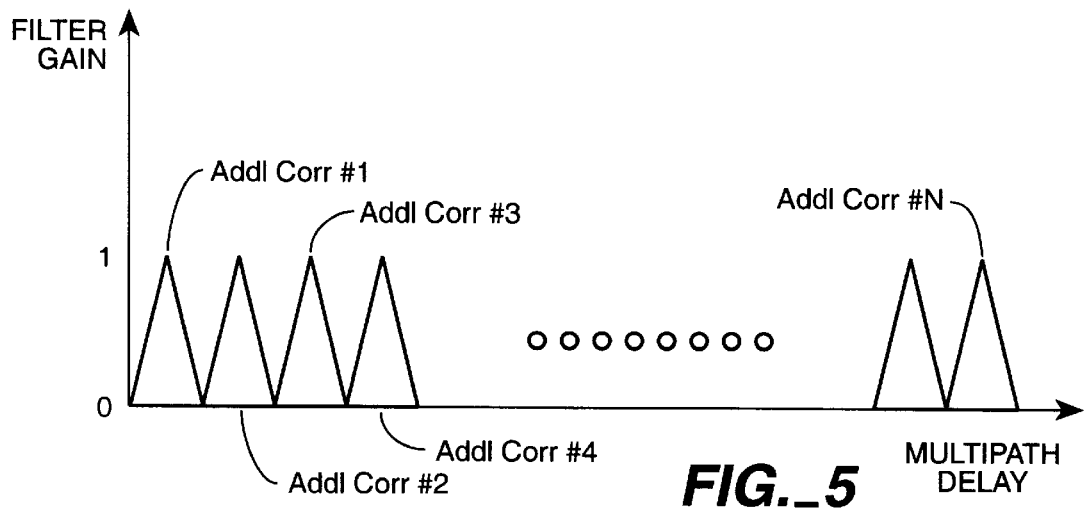
FIG._5
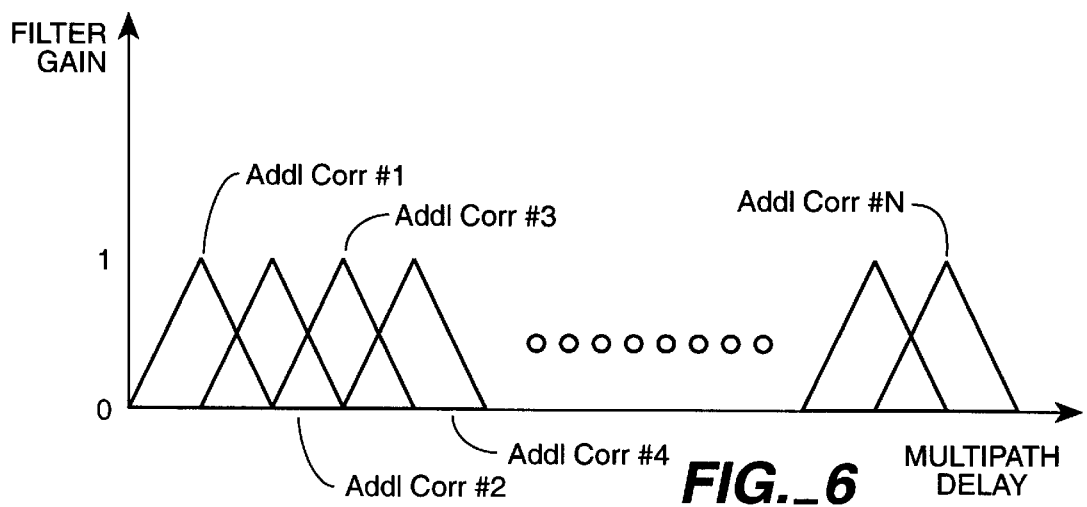
FIG._6
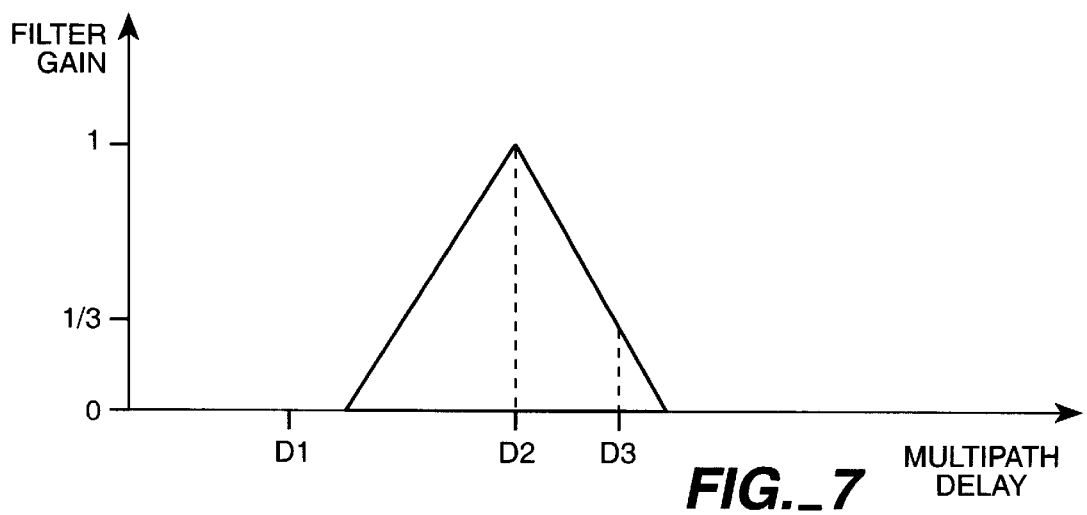
FIG._7

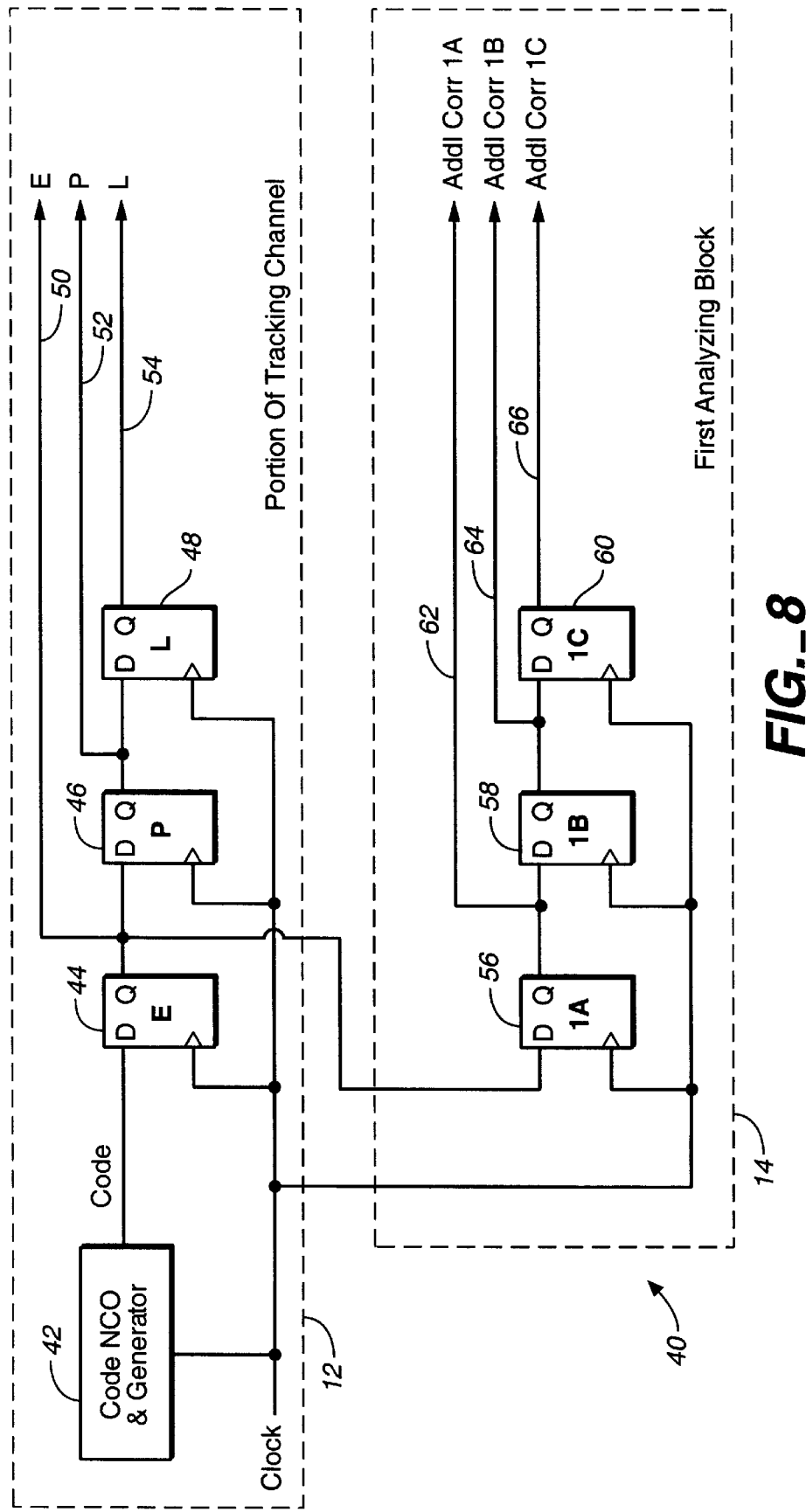
FIG._8

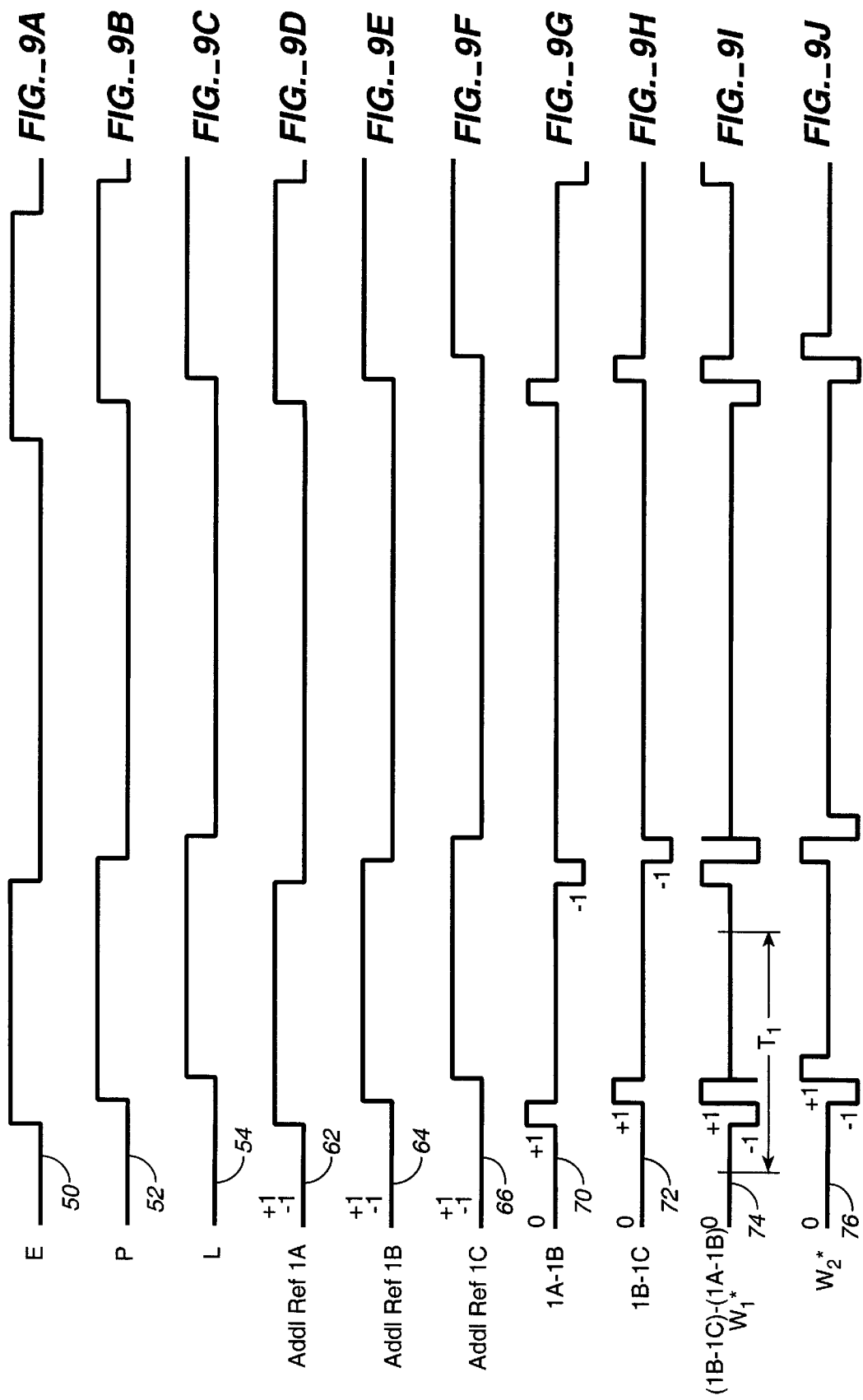

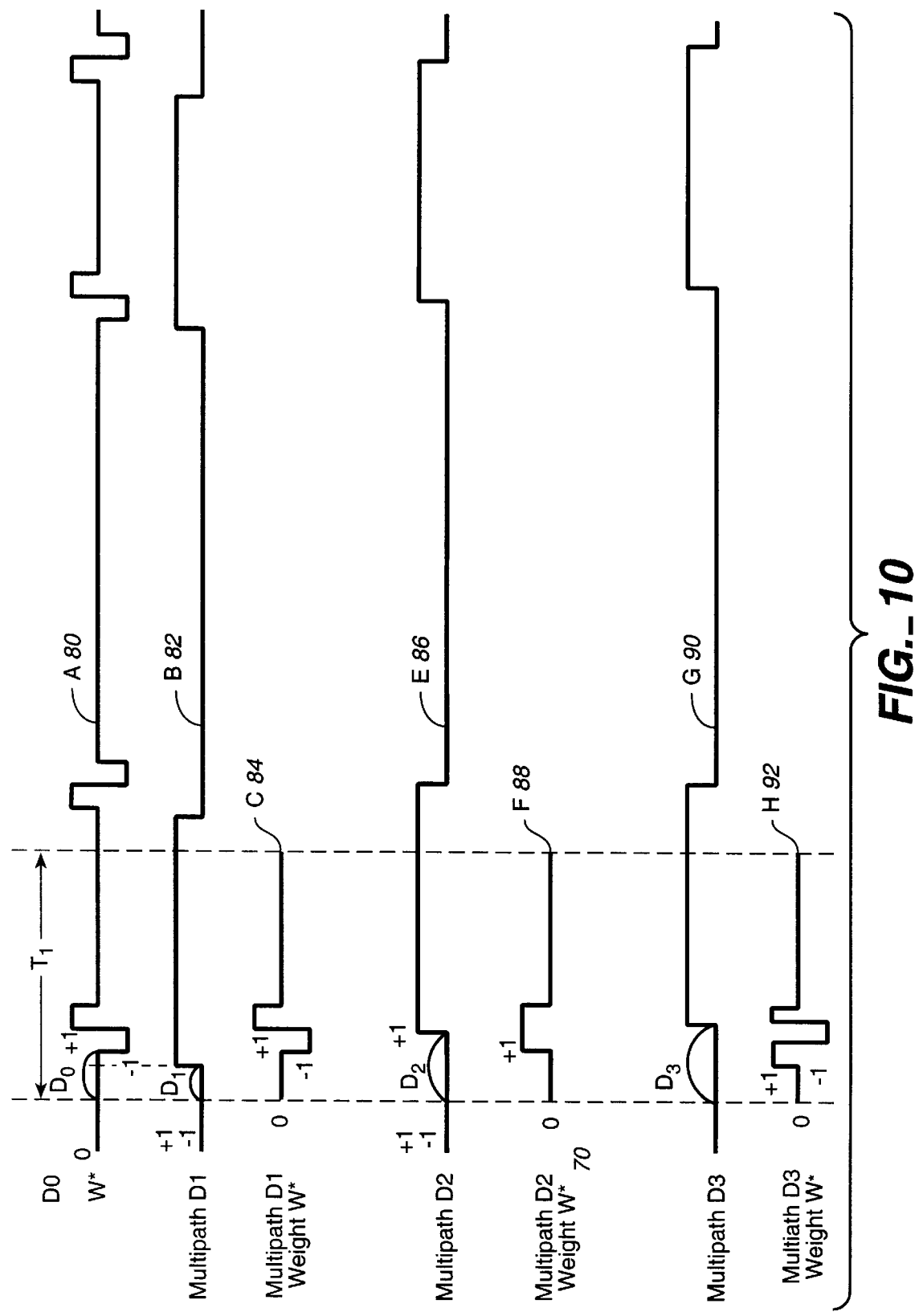
FIG._10

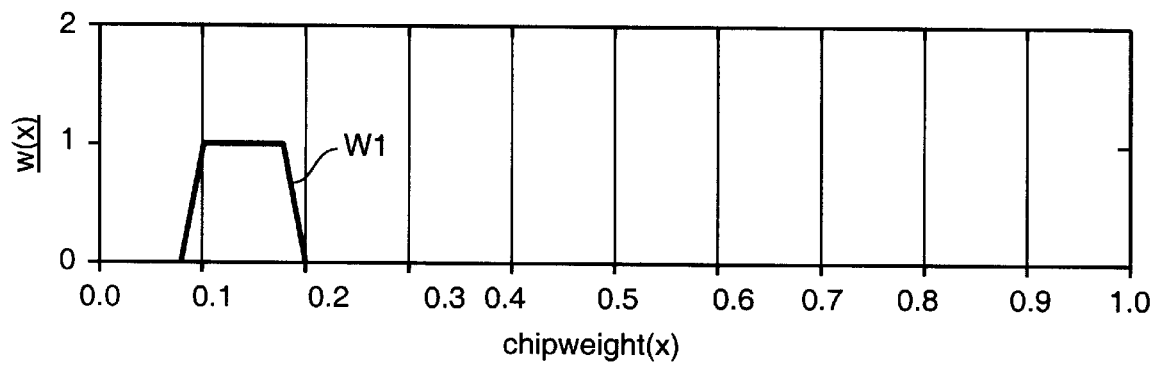
FIG._11A
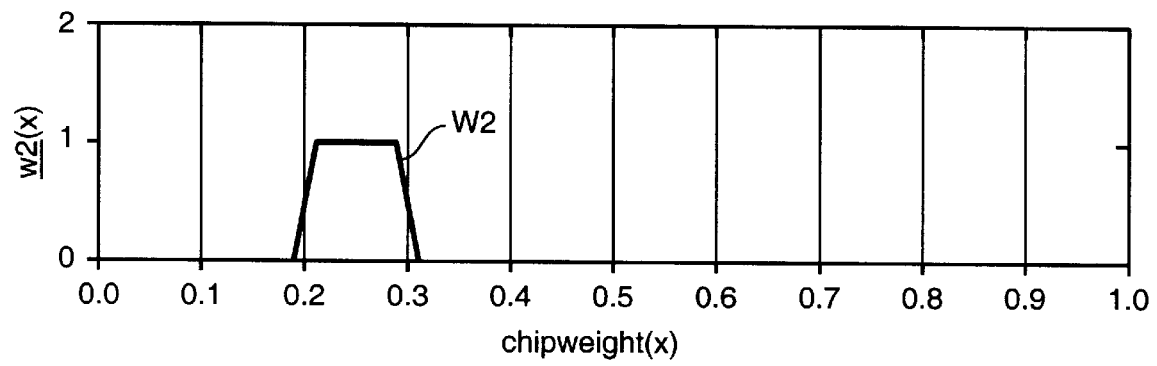
FIG._11B
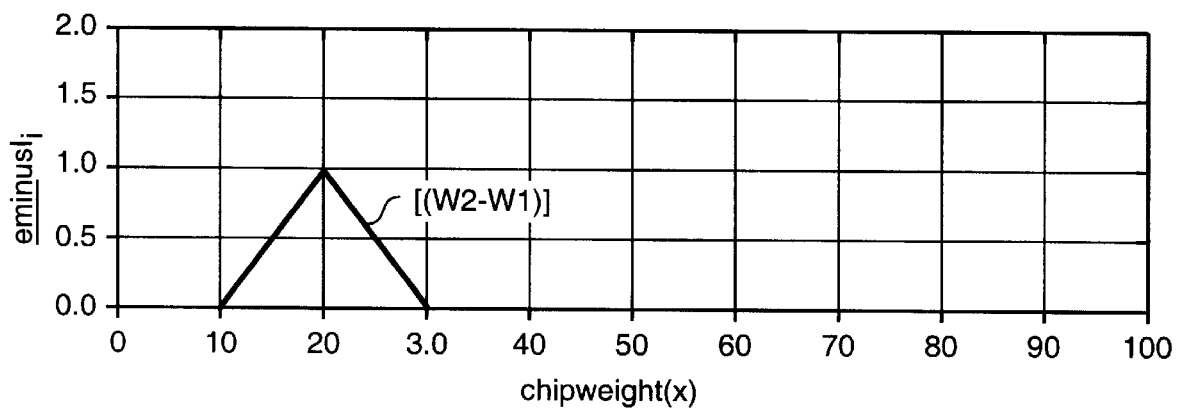
FIG._11C

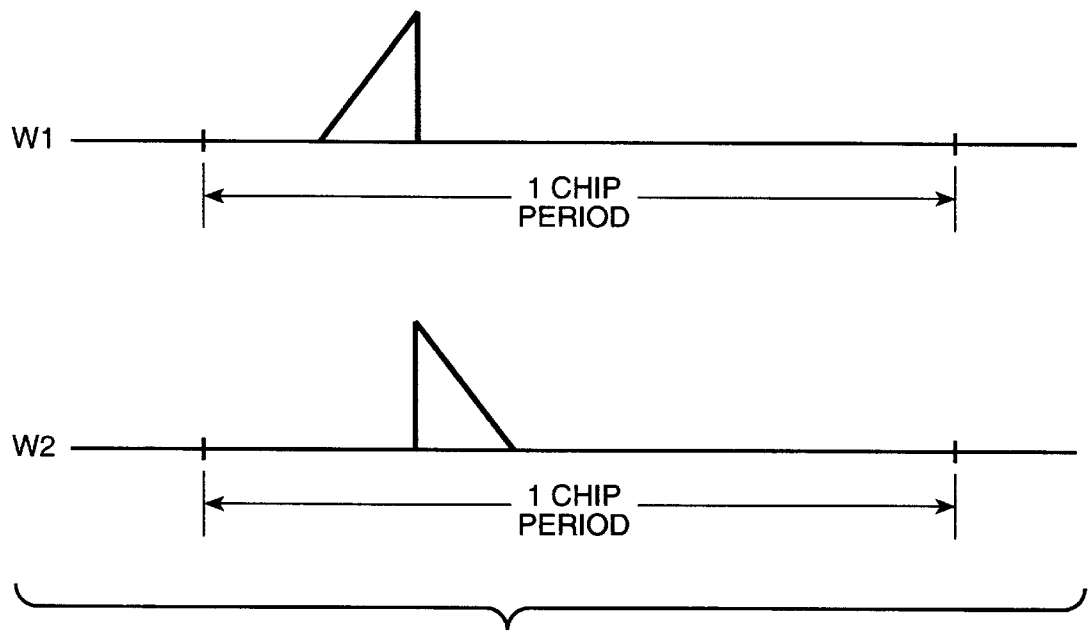
FIG._12
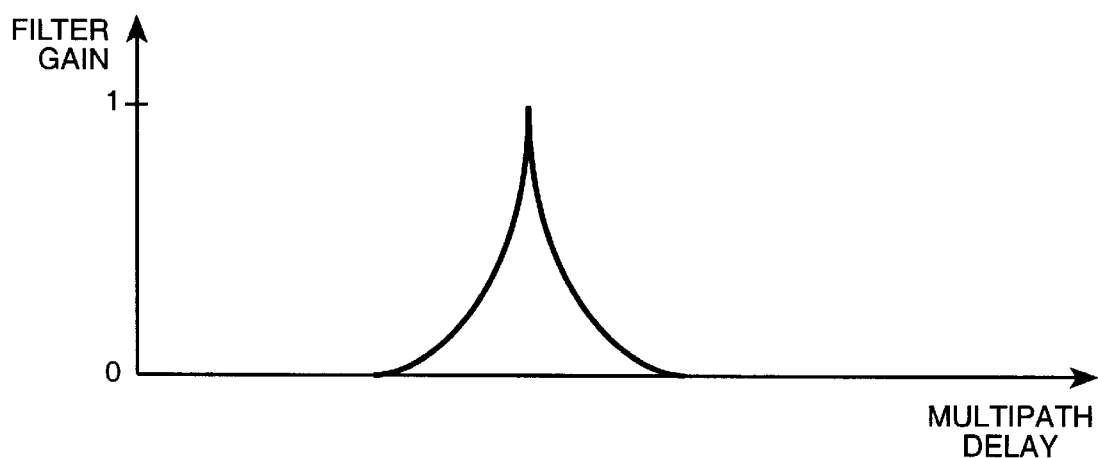
FIG._13

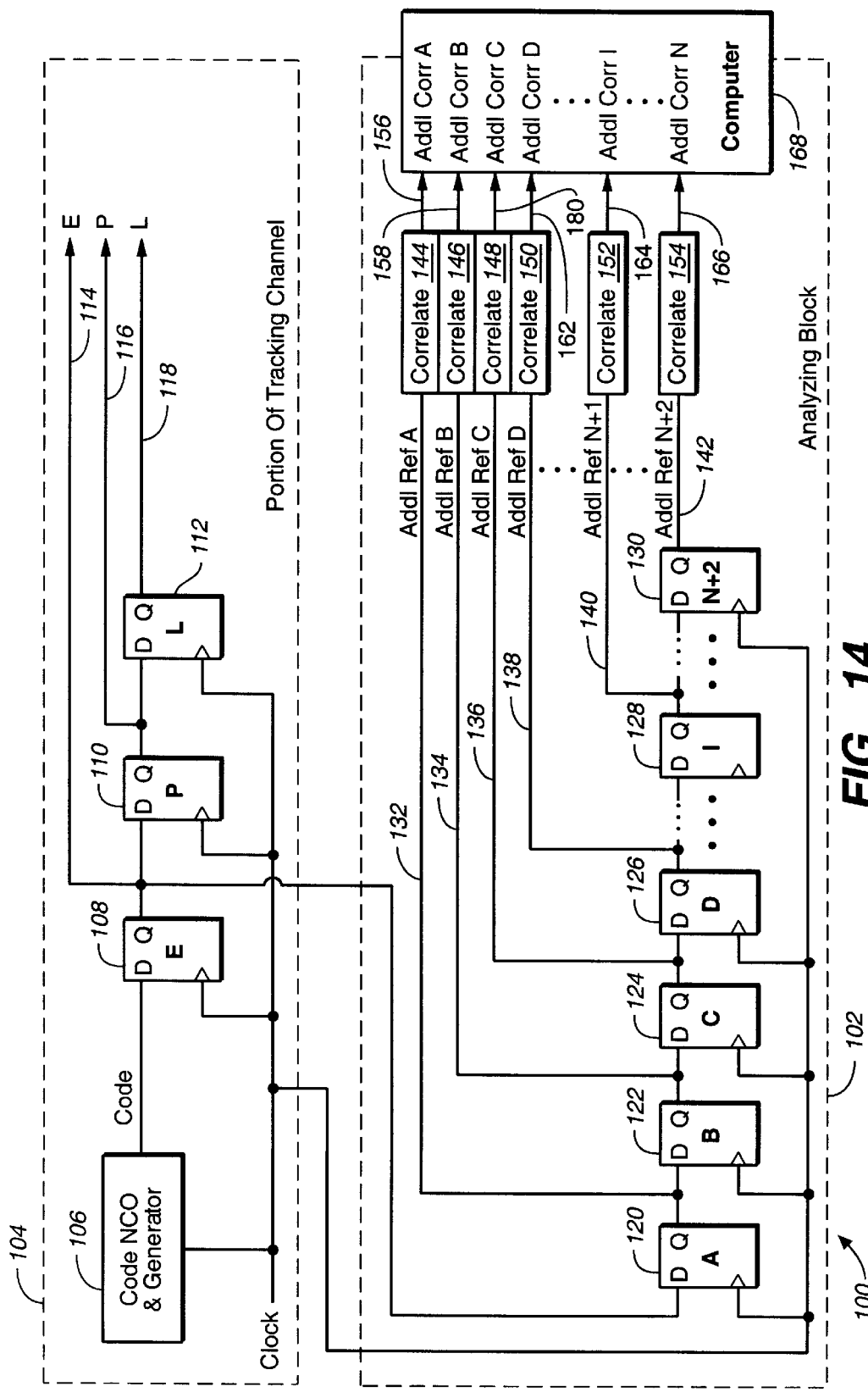
FIG._14

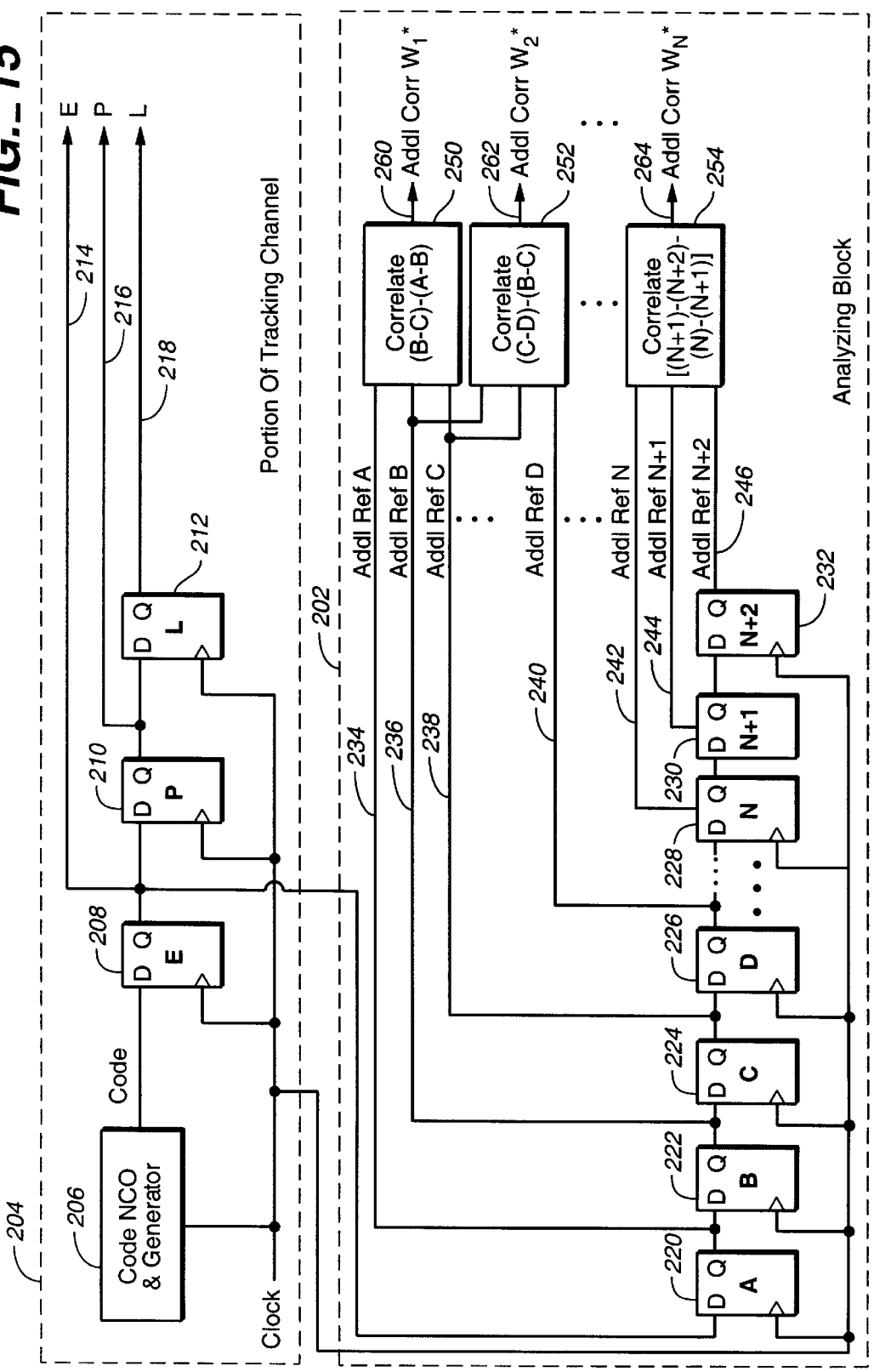

CODE MULTIPATH ANALYZER USING WEIGHTED OR MODIFIED CORRELATIONS

BACKGROUND

Reference to a Satellite Positioning System or SATPS herein refers to a Global Positioning System (GPS), to a Global Orbiting Navigation System (GLONASS), and to any other compatible satellite-based system that provides information by which an observer's position and the time of observation can be determined.

The complete GPS system consists of 24 operational satellites and provides 24-hour, all-weather navigation and surveying capability worldwide.

The GPS satellites transmit at frequencies L1=1575.42 MHz and L2=1227.6 MHz modulated with two types of codes and with a navigation message. The two types of codes are the C/A-code and the P-code.

Two types of observables are of interest to users. One is the pseudo-range, which equals the distance between the satellite and the receiver plus small corrective terms due to clock errors, the ionosphere, the troposphere, and the multipath. Given the geometric positions of the satellites (satellite ephemeris), four pseudo-ranges are sufficient to compute the position of the receiver and its clock error. Pseudo-ranges are a measure of the travel time of the codes.

The second observable, the carrier phase, is the difference between the received phase and the phase of the receiver oscillator at the epoch of measurement. Receivers are programmed to make phase observations at the same equally spaced epochs. The receivers also keep track of the number of complete cycles received since the beginning of a measurement. Thus, the actual output is the accumulated phase observable at preset epochs.

(The above-referenced discussion is provided in the book "GPS Satellite Surveying", Second Edition, authored by Alfred Leick, and published by John Wiley & Sons, Inc. in 1995; pp 1–3).

The multipath errors originate with contamination of SATPS signals by delayed versions of these signals. For some applications using either pseudo-range or carrier phase observables, multipath is the dominant error source. The multipath disturbance at any location is highly dependent on the surrounding environment. The most direct approach for reducing this error is to select an antenna site distant from reflecting objects, and to design antenna/back plane combinations to further isolate the antenna from its surroundings. However, this approach suffers from several problems. Indeed, we may not have the luxury of putting an antenna in the open area. Also, there is a problem with design of antenna/back plane combinations: it is bulky, it increases the cost of the apparatus, and it is inconvenient.

Thus, what is needed is a technique which gives one an opportunity to assess the multipath properties at a given location, potentially in real time, in order to determine the code multipath error signal as a function of the delay of the multipath signal at the present site. This technique implemented in real time would allow one to roam about the selected site to find an optimal location which would introduce the least amount of multipath disturbance. This knowledge can be utilized in optimal placement of fixed antennas of base or reference stations.

SUMMARY

The present patent is unique because it disclosed an apparatus and method which gives one an opportunity to assess the code multipath properties at a given location and potentially in real time.

One aspect of the present invention is directed to an apparatus for analyzing a composite signal. The composite signal includes a direct signal transmitted from the at least one satellite and an incoming code multipath distortion component.

In one embodiment, the apparatus comprises: a satellite code tracking circuit configured to receive the composite signal and an additional analyzing circuit configured to analyze the incoming code multipath distortion component. The satellite code channel tracking circuit is configured to generate a satellite code tracking function having a tracking code multipath distortion component. The tracking code multipath distortion component is a function of the incoming code multipath distortion component and a code multipath response envelope of the tracking circuit.

In one embodiment, the satellite code channel tracking circuit further comprises at least two partial code tracking circuits and at least one additional estimation tracking circuit. Each partial tracking circuit is used to minimize the tracking code multipath distortion component. Each additional estimation circuit is used to estimate and further minimize a residual tracking code multipath distortion component.

In one embodiment, at least one partial code tracking circuit further comprises a Weight tracking circuit configured to provide a satellite code tracking function having a code multipath response envelope.

In another embodiment, at least one partial code tracking circuit further comprises a Modify tracking circuit configured to provide a satellite code tracking function having a code multipath response envelope.

In one additional embodiment, at least one additional estimation circuit further comprises a Weight estimation circuit configured to estimate and further minimize a residual tracking code multipath distortion component.

Yet, in one more embodiment, at least one additional estimation circuit further comprises a Modify estimation circuit configured to estimate and further minimize a residual tracking code multipath distortion component.

The Weight tracking or estimation circuit can comprise a Weight tracking or estimation circuit at Input level, at Local Carrier reference level, at Complex Mixer circuit level, at Local Code reference level, and at Code Correlation circuit level.

Similarly, the Modify tracking or estimation circuit can comprise a Modify tracking or estimation circuit at Input level, at Local Carrier reference level, at Complex Mixer circuit level, at Local Code reference level, and at Code Correlation circuit level.

In one embodiment, the analyzing circuit further comprises a plurality of K analyzing circuits (K is an integer) configured to analyze the incoming code multipath distortion component comprising N portions of the incoming code multipath distortion component (N is an integer).

In one embodiment, the satellite code channel tracking circuit further comprises: (a) a code NCO & Generator block configured to generate a local code signal, (b) an Early (E) flip-flop configured to generate an Early (E) signal, (c) a Punctual (P) flip-flop configured to generate a Punctual (P) signal, and (c) a Late (L) flip-flop configured to generate a Late (L) signal.

In one embodiment, the analyzing circuit further comprises (N+2) serially connected additional flip-flops configured to generate (N+2) additional correlation reference signals (N+2) used by a computer to form N additional effective weighted correlation functions that are utilized to analyze N portions of the incoming code multipath distortion signal.

In another embodiment, the analyzing circuit further comprises (N+2) serially connected additional flip-flops configured to generate (N+2) additional correlation reference signals (N+2) and N dedicated hardware circuits configured to form N additional weighted correlation functions that are utilized to analyze N portions of the incoming code multipath distortion signal.

One more aspect of the present invention is directed to a method for analyzing a composite signal, wherein the composite signal includes a direct signal from at least one communication satellite and an incoming code multipath distortion component.

In one embodiment, the method comprises the following steps: (a) receiving the composite signal by utilizing a satellite tracking circuit, and (b) analyzing the incoming code multipath distortion component using an analyzing circuit.

BRIEF DESCRIPTION OF THE DRAWINGS

FIG. 1 depicts an example of the code multipath analyzer output.

FIG. 1A illustrates a code multipath response envelope of the tracking circuit for a standard correlation.

FIG. 1B shows the code multipath response envelope of the tracking circuit disclosed in the patent application #1.

FIG. 1C illustrates the code multipath response envelope of the tracking circuit disclosed in the patent application #2.

FIG. 1D depicts the code multipath response envelope of the tracking circuit disclosed in the patent applications #3 or #4.

FIG. 1E shows a blown-up left portion of the code multipath response envelope of the tracking circuits of patent applications #2 and #3, or #4.

FIG. 2 depicts the architecture of the weighted tracking circuit employed in the patent applications #2 ,#3, or #4.

FIG. 3 shows the general block diagram of the apparatus of the present invention.

FIG. 4A depicts the semi-ideal filtering function.

FIG. 4B illustrates the ideal filtering function.

FIG. 5 shows the basic filter shape for the multipath analysis.

FIG. 6 depicts an overlapping filtering function for the multipath analysis.

FIG. 7 describes the filter function for the tracking circuit with the infinite bandwidth (BW).

FIG. 8 shows an example of the circuitry for an analyzing block of FIG. 2 along with the circuitry for the tracking channel of FIG. 2.

FIG. 9 depicts the associated signals of the circuitry of FIG. 8.

FIG. 10 shows how the filtering function W* of FIG. 9 relates to the filtering function of FIG. 7.

FIG. 11A shows the first weighting signal W1.

FIG. 11B depicts the second weighting signal W2.

FIG. 11C illustrates the filtering function from (W2–W1).

FIG. 12 depicts the arbitrary weight functions W1 and W2.

FIG. 13 shows the filter function based on the arbitrary weight functions of FIG. 12.

FIG. 14 illustrates an embodiment of the code multipath analyzer, wherein a computer is used to build the filtering functions.

FIG. 15 depicts an embodiment of the code multipath analyzer, wherein a plurality of dedicated hardware circuits are used to build the filtering functions.

FULL DESCRIPTION OF THE PREFERRED EMBODIMENTS

The following U.S. patent applications are specifically referred to in the present U.S. patent application and incorporated herein by reference in their entirety:

a) patent application #1 entitled "Suppression Of Multipath Signal Effects", Ser. No. 08/650,631, disclosed by Rayman Pon and filed on May 20, 1996, issued as U.S. Pat. No. 5,903,597

(b) patent application #2 entitled "Variable Suppression Of Multipath Signal Effects", Ser. No. 08/650,338, disclosed by Rayman Pon, Kreg Martin, and Dominic Farmer and filed on May 20, 1996;

(c) patent application #3 entitled "Code multipath error estimation using weighted correlations", Ser. No. 08/683,859, disclosed by Rayman Pon and filed on Jul. 19, 1996;

d) patent application #4 entitled "Code multipath estimation for weighted or modified tracking using weighted or modified correlations", Ser. No. 08/833,183, disclosed by Rayman Pon and filed on April 4, issued as U.S. Pat. No. 5,917,866.

In general, the subject of the present invention comprises an apparatus and a method for analyzing an arbitrary composite signal (not necessarily a satellite signal) that includes a distortion component. In particular, the subject of the present invention is a code multipath analyzer configured to analyze a composite signal comprising a satellite direct signal and a code multipath distortion error signal. FIG. 1 depicts an example of code multipath analyzer output that is graphed with multipath delay on the x-axis and relative multipath error signal, or the multipath presence, on the y-axis.

The x-axis of interest begins at 0 delay and continues until about 1–2 chip delay. Delays less than zero (negative delays) are of no interest since it is assumed that multipath signals always arrive to the antenna later than the direct signal. Delays greater than about 1–2 chips are of no interest because the pseudo random (PRN) codes are de-correlated beyond 1–2 chip delays within the tracking circuit.

The multipath signal depicted along the y-axis includes in general both positive and negative values, depending on whether the multipath signal is in-phase or out-of-phase compared to the direct signal. The multipath analyzer result is somewhat similar to a spectrum analyzer result, wherein the latter gives an indication of the signal energy as a function of signal frequency for a given signal. In the spectrum analyzer case, the signal energy is always positive. In the multipath analyzer case, the multipath presence signal can assume both positive and negative values as depicted in FIG. 1.

In one embodiment, the present invention requires only a single satellite to be tracked by a satellite receiver in real time at a given location in order to determine the multipath presence signal as a function of the multipath signal delay. At a particular location, we can switch between the various satellites in the sky to view their multipath signal content. In another embodiment, the apparatus of the present invention can track all satellites in view while at the same time analyzing the multipath content of a composite signal including a direct signal from one selected satellite.

There is no special tracking requirement for the code multipath analyzer. However, in the preferred embodiment, it is useful to have the code multipath analyzer incorporating the tracking circuitry with the minimum code multipath response envelope. Indeed, the code multipath analyzer having such tracking circuitry allows one to perform the code multipath presence measurements starting with the lowest multipath presence signal as the point of reference, because the tracking code multipath presence signal is a function of the incoming code multipath distortion component and a code multipath response envelope of the tracking circuit.

To choose the proper tracking circuitry we can refer to the known circuitry solutions. For instance, FIG. 1A illustrates a code multipath response envelope of the standard tracking circuit (without weighted or modified circuitry) resulting in a standard code multipath response envelope. On the other hand, the tracking circuit disclosed in the patent application #1 has a multipath response envelope shown in FIG. 1B. The multipath response envelope of FIG. 1B has non-zero component only for small or large delays. The further reduction of the multipath response envelope for large delays was achieved in the patent application #2 as shown in FIG. 1C. The residual multipath response envelope for small delays still found in the apparatus of patent application #2 can be further decreased by using weighted or modified estimation circuitry disclosed in the patent applications #3 or #4 as shown in FIG. 1D. The blown-up portion of the code multipath envelope of the tracking circuitry of the patent applications #3 or #4 is shown in FIG. 1E for small delays. In all curves of FIGS. 1A–1E the assumption was that the amplitude of the multipath signal is one-half of the amplitude of the direct signal.

Thus, to decrease the reference tracking code multipath distortion component, it is important to have the code multipath analyzer incorporating the tracking circuitry of the patent applications #3 or #4.

The general block diagram (10) of the apparatus of the present invention is shown in FIG. 3. In one embodiment, the reduced multipath tracking and/or estimation can be achieved by using the standard non-weighted and non-modified correlation circuits in a non-standard way, that is by performing the algebraic optimization of the final correlation formulas, as described in the patent applications #1 or #3.

In another embodiment, as explained above, the apparatus (10) of FIG. 3 can include the reduced multipath tracking channel (12) that can be implemented by utilizing the circuitry of the patent applications #3 or #4.

As disclosed in the patent application #4, a code tracking channel (12) can use at least two partial blocks which respectively obtain the Early (E) and Late (L) correlations which are used for code tracking purposes. Each of these partial blocks can use weighted or modified correlations to obtain the E and L correlations which are used for code tracking.

The estimation circuits can be used to provide additional correlations using either weighted or modified correlation techniques. The correlation techniques used for estimation of the remaining code multipath is independent of the tracking method. Therefore, all combinations of weighted or modified code tracking correlations and weighted or modified estimation correlations are possible. For code tracking purposes, the apparatus of the present invention should include at least two correlation channels: an Early (E) correlation channel (12) and a Late (L) correlation channel. On the other hand, for estimation purposes, the apparatus of present invention should include at least one inphase (I) correlation channel.

According to the patent application #4, the Weight or Modify signals can be applied at five different levels to achieve the reduction of the code multipath residual signals: (1) at the input level, (2) the local carrier generator level, (3) the complex mixer level, (4) the local reference code generator level, and (5) the code correlator level. Therefore, there are five embodiments of partial tracking or estimation circuit (12).

According to the patent application #4, in the first Weight Input signal embodiment of the tracking channel (12), the inphase and quadrature components (I & Q) of the input signal are weighted. The I and Q components of the weighted input signal are further mixed with the I and Q components of the local code signal in the complex mixer which results in the I or Q component of the downconverted baseband signal. The local code reference signal is correlated with the downconverted baseband signal in the code correlator. The correlation resulting signal is accumulated in the Accumulate and Dump circuit and the resulting signal is fed into the computer (20).

The computer (20) is used to close the code and carrier loops and to optimize the additional signals in order to estimate, minimize and analyze the contribution of the multipath code signal into the received satellite composite signal.

The Weight signal is introduced in this embodiment at the input level. The Weight signal can be implemented using a Weight Generator circuit as discussed in the patent application #4.

In the modified input signal embodiment the Weight input is replaced by the Modify input.

In the first modified embodiment, the inphase and quadrature components (I & Q) of the input signal are modified in the Modify Input block. The I and Q components of the modified input signal are further mixed with the I and Q components of the local carrier signal in the complex mixer which results in the I or Q component of the downconverted baseband signal. The local code reference signal is correlated with the downconverted baseband signal in the code correlator. The correlation resulting signal is accumulated in the Accumulate and Dump circuit and the resulting signal is fed into the computer (20).

The Modify signal can be implemented using the Generator of Modify signals as was discussed in the patent application #4.

In the second weighted embodiment, at least one partial tracking satellite channel circuit or an additional estimation circuit (12) is weighted at the locally generated carrier level. In this embodiment, the additional Weight signal is introduced at the locally generated carrier level. The further processing of the resulting signal is the same as in the first Weight embodiment as discussed above.

Similarly, in the second modified embodiment, at least one partial code tracking satellite channel circuit or an additional estimation circuit (12) is modified at the locally generated carrier level. In this embodiment, the additional Modify signals are also introduced at the locally generated carrier level. The further processing of the resulting signal is the same as in the weighted local carrier reference signal embodiment.

In the third weighted embodiment of the tracking circuit (12), the complex mixed signal is weighted in the Weight Complex Mixed signal block. The additional Weight signals are introduced at the Weight complex mixed signal level and are used to estimate and optimize the code multipath residual signal. The further processing of signals in this embodiment is the same as in the second weighted embodiments of the tracking channel (12).

In the third modified embodiment of the tracking channel (12), the complex mixed signal is modified in the Modify Complex Mixed signal block. The additional Modify signals are again introduced at the Modify complex mixed signal level and are used to estimate and minimize the code multipath residual signal. The further processing of signals in this embodiment is the same as disclosed above in relation to the second modified embodiments of the tracking circuit.

The fourth weighted embodiment of the tracking channel (12) relates to weighting of signals at the local reference code level. In this embodiment, additional Weight signals are introduced at the local code level in the block Weight Local Code.

In the fourth modified embodiment, the additional Modify signals are introduced at the Modify Local Code level.

The fifth weighted embodiment of the tracking channel (12) utilizes the additional Weight signals at the Weight Correlated Signal level.

Finally, in the fifth modified embodiment of the tracking channel (12), the additional Modify signals are introduced at the Modify Correlated Signal level.

Partial tracking circuits can be independent from each other. The additional estimation circuits are also independent from the partial tracking circuits. It follows, that all combinations of weighted or modified tracking or additional estimation circuits can be used in the tracking channel (12) of the present invention (10) (as shown in FIG. 3). The Weight or Modify signal can be applied at each of the five processing levels.

It is important to underscore that the weighted tracking or weighted estimation includes a "multiply" operation on signals, wherein the modified tracking or modified estimation includes an "addition" operation on signals. Therefore, the weighted correlation tracking and the modified correlation tracking, as well as the weighted estimation and the modified estimation are substantially different modes of the code tracking or estimation operation.

Referring back to FIG. 3, the apparatus of the present invention includes a plurality of N analyzing circuits (14, 16, . . . 18) that are used to analyze the N portions of the incoming code multipath presence signal, and the computer (20). N is an integer.

The computer (20) communicates with the reduced multipath tracking channel (12). The relevant signals from the tracking channel (12) are the Accumulate and Dump correlation sums (see discussion above). The relevant signal from the computer (20) to the tracking channel (12) is the control signal to the code Phase Lock Loop (PLL) that can be implemented using the code numerical control oscillator (NCO). The control signal is to steer the phase of the code (NCO) in such a way that the tracking channel (12) remains locked onto the selected satellite being tracked.

This steering control signal is also passed along to the analyzing blocks (14, 16, . . . 18), wherein each "i" analyzing block may include its own code numerical control oscillator $(NCO)_{i-Analyzer}$, i being an integer greater or equal to 1 and less or equal to N. The overall purpose of the steering control signal is to keep the code $(NCO)_{i-Analyzer}$ in all the analyzing blocks at all times synchronized and at the same codephase as code NCO of the tracking channel (12). The analyzing blocks implement different weighted schemes in their respective correlation sums to essentially pick off (or to be sensitive only to) different multipath delays of the multipath signal.

For example, the analyzing correlation block #1 should respond only to multipath delays from 0 to ($\frac{1}{10}$)-th of a chip, the analyzing correlation block #2 should be programmed to respond only to multipath delays from ($\frac{1}{10}$)-th to ($\frac{2}{10}$)-th of a chip, and so on. Thus, the N analyzing blocks should cover the whole delay of 1–2 chips of interest where the multipath presence signal is non-zero (see FIG. 1). In effect, each analyzing block provides a bandpass filter type of function which will only pass multipath delays within a certain delay range. The semi-ideal filtering function is shown in FIG. 4A. The ideal filtering function is shown in FIG. 4B. It resembles the train of Dirac delta-functions.

The output of the analyzing blocks is the accumulate and dump correlation sums which are possibly already combined in some algebraic manner. In one embodiment, these output accumulate and dump correlation sums may be filtered to reduce noise, before being presented to the user. The correlation sums in themselves are not in any meaningful units (such as meters of multipath). Instead, they provide a good relative measure of the multipath disturbance (positive or negative) in small delay region that a particular analyzing circuit is programmed to respond to. With some calibration and using the correlations obtained from the tracking channel (12), these sums can be converted to an equivalent multipath presence in units of distance, if needed.

Just as in the fast Fourier transform (FFT) for spectrum analysis, the filtering function for the multipath analyzer is not a perfect impulse function. In the FFT, the filter is actually the sinc function centered at the center of the desired frequency. With more elaborate spectrum analyzers, the filter function could be made more and more impulse-like in shape with more complex passband filter implementations. In the multipath analyzer, the same is true. The basic shape that is easiest to obtain for each filter is a triangle, due to the properties of correlation. With more complex circuitry, the shape can be made such that the sides of the triangle can bow inward, thus more closely approximating an impulse function. The basic filter shape for the multipath analysis is shown in FIG. 5. The filter regions can be also made to overlap, as shown in FIG. 6. This is similar to FFT, where the sidelobes of the sinc function overlap adjacent bins of the FFT, but with much less amplitude than the main lobe.

FIG. 7 describes the filter function for the tracking circuit with the infinite bandwidth (BW). The incoming signal is a composite signal which includes a direct signal as well as potentially multiple multipath signals, each with a different gain and multipath delay. From the antenna down to the correlation circuitry, the tracking channel circuitry is linear as explained in the patent application #4.

Thus, one can analyze a single multipath signal at a time and then superimpose the effect of each single multipath signal to determine the overall effect of the composite signal.

Let us assume that we have a multipath signal with delay D1. The gain of the filter of FIG. 7 is zero at the delay D1, so that the output of the analyzing cirucit for the portion centered at delay D2 will output zero for any multipath signal present with the D1 delay value.

On the other hand, suppose that we have a multipath signal with delay D2. This corresponds to the maximum gain of the filter function. The response of the analyzing circuit for this portion will be maximum for this multipath signal.

Let us consider a multipath signal with delay D3. The filter gain at this point is only $\frac{1}{3}$. Therefore, for the multipath signals having equal amplitudes and entering the antenna with delays D1, D2, and D3, the response from the analyzing cirucit for this portion centered at delay D3 will be as follows: the maximum response for the multipath signal with delay D2, ⅓ of maximum response for the multipath signal with delay D3, and zero response for the multipath signal with delay D1. The output of the analyzing circuit will combine these responses together (superposition applies) and only this combined result is available to the computer for the analysis.

FIG. 8 shows an example of the circuitry (40) for the first analyzing block (14) of FIG. 3 along with the circuitry for the tracking channel (12) of FIG. 3. The associated signals are illustrated in FIG. 9. The locally generated code punctual signal (P) (52) for the tracking channel (12) provides a good indication of the relative alignment of the incoming composite signal and the locally generated signal, since the incoming composite signal and the locally generated code signal should be aligned very closely while the satellite is being tracked. Therefore, one can use the P signal to represent the incoming composite signal.

One can obtain the standard non-weighted correlation signal Addl Corr 1A (62) using the flip-flop 1A (56), the standard non-weighted correlation signal Addl Corr 1B (64) using the flip-flop 1B (58), and the standard non-weighted correlation signal Addl Corr 1C (66) using the flip-flop 1C (60). The signals Addl Corr 1A, Addl Corr 1B, and Addl Corr 1C can be utilized to build a first portion of the filtering function responsible for analyzing the first portion of the incoming multipath presence signal.

In one embodiment, the computer (20) of FIG. 3 receives the accumulate and dump correlation sums of Addl Corr 1A, Addl Corr 1B, and Addl Corr 1C and calculates the first weighting signal:

W1=(Addl Corr 1A−Addl Corr 1B);

shown in FIG. 11A; calculates the second weighting signal:

W2=(Addl Corr 1B−Addl Corr 1C);

shown in FIG. 11B; and calculates the resulting weighting signal (W2−W1):

(W2−W1)=((Addl Corr 1B−Addl Corr 1C)−(Addl Corr 1A−Addl Corr 1B));

the response is shown in FIG. 11C.

The resulting weighting signal (W2−W1) can be utilized to build the first portion of the filtering function used for analyzing the first portion of the incoming multipath signal.

In this embodiment, three final correlation sums should be read back each time from the correlation block to the computer, and the computer perform the arithmetic operations digitally.

In the preferred embodiment, the dedicated hardware circuitry (see discussion below) can be used for calculating the filtering function (W2−W1) (whose response is shown in FIG. 11C):

(W2−W1)=((Addl Corr 1B−Addl Corr 1C)−(Addl Corr 1A−Addl Corr 1B)).

In this embodiment, only a single final correlation sum should be read back each time from the correlation block to the computer. In this embodiment, the dedicated hardware is used to perform arithmetic operations. This saves time because the dedicated hardware computation is faster than the digital computation. This also saves the overall hardware since fewer correlations are needed.

The signal (74) of FIG. 9 and the signal (80) of FIG. 10 represent the effective weighting W*=(W2−W1) for the filtering function. One can demonstrate how the filtering function W* relates to the filtering function of FIG. 7 by analyzing how the three multipath signals with delays D1, D2, and D3 correspond to different portions of the filtering function of FIG. 7. Due to the pseudo random nature of the PRN codes, it is sufficient to analyze a single period of the PRN sequence which coincides with the period T1 of the punctual signal (P).

The multipath signal with delay D1 is shown as signal B (82) in FIG. 10. The signal (82) has a delay D1 with respect to the punctual locally generated code signal. As shown in FIG. 10, the delay D1 is less than the delay D0 of the first non-zero portion of the weight function W* (80). The multipath signal (82) has also a gain associated with it which is less than 1, and can be either positive or negative compared to the direct signal. As was mentioned above, one only needs to analyze one period T1 of the multipath signals. Within this period, one simply can multiply the weight function W* by the multipath signal and integrate or accumulate the product for the duration of the period. The result of the multiply operation is shown as signal C (84) of FIG. 10. Integrating within one period T1 yields the function C having zero value for the D1 delay: C(D1)=0 which is the value of the filter function of FIG. 7 for the delay D1.

Signal E (86) represents a multipath signal with delay D2 and the signal F (88) shows the result of multiplication of signal E by the weight function W* over the period of T1. Integration of the resulting signal F(D2) yields a maximum value for the delay D2 which corresponds to the peak of the filtering function of FIG. 7. Similarly, signal G (90) shows a multipath signal with delay D3 and signal H (92) shows the multiplication result. Integration of the signal H (D3) yields a value which is about ⅓ of the value of the F(D2): H(D3)=⅓×F(D2). This result corresponds to the tail end of the filtering function of FIG. 7.

Analyzing other multipath signals, one can verify that the increase in the filtering function gain is linear with increasing multipath delay before the delay D2 is reached starting from delay D0, and is linearly decreasing after the delay D2 until it reaches zero value.

Now it is clear that for different positions and widths of the weight functions W1 and W2 one can move the center point and change the width of the filter function W*. Given a parallel bank of such blocks each with differently programmed center points, one can simultaneously obtain the multipath presence as a function of multipath delay. In other words, one could create a plot similar to the plot of FIG. 1 with quantized steps for the x-axis, depending on how many parallel filter sections are implemented.

Given the parallel bank of filter sections, the accumulate and dump correlation sums obtained from each section can be filtered to reduce noise. The obtained value can be plotted on the y-axis with the x-axis taking on the center point of the filter function. The filter for noise reduction can have a time constant which is dependent on the motion of the antenna. For stationary measurements, the time constant can be long, thereby reducing the noise as much as possible, because the multipath signal is slowly changing. In the dynamic measurement, the time constant should be much shorter, since the multipath signal can change much faster depending on its spatial location.

Each analyzing circuit should be able to generate effective weighted or modified correlations on at least one of the five possible levels. (Please, see the discussion above and the patent application #4 for the reference). The final arithmetic to get the right combination can be performed either in dedicated hardware circuitry or in a computer.

The weighting functions used so far in the examples had a weight of 0 or 1. The usage of different weighting functions can change the shape of the filter function from a triangle form to some other form. For instance, suppose that one would use the weight function W1 and W2 as shown in FIG. 12. When one takes the correlations and performs the W2−W1 substraction, one would arrive at the filter function of FIG. 13. The filtering function of FIG. 13 more closely approximates the desired impulse filter function, but the weighting functions of FIG. 12 are potentially much more difficult to implement. One way to implement the weighting functions of FIG. 12 is to use the circuitry disclosed in the patent application #1. And again, one would need N arbitrary weighted function circuits which yield the filter function of FIG. 13 to analyze N portion of the code multipath presence signal of FIG. 1.

In one embodiment, the tracking channel (12) of FIG. 3 is depicted as block (104) of FIG. 14.

The tracking channel (104) comprises the code NCO & Generator block (106) generating a local code signal, the Early (E) flip-flop (108) generating an Early (E) signal (114), the Punctual (P) flip-flop (110) providing a Punctual (P) signal (116) and the Late (L) flip-flop outputting a Late (L) signal (116).

The associated signals of the tracking block (104) are depicted in FIG. 9 (see discussion above). The punctual signal P is used to represent the incoming signal relative timing because it is aligned with the incoming signal.

In one embodiment, the analyzing block (22) of FIG. 3 is shown in FIG. 14 as block (102). The analyzing circuit (102) comprises (N+2) serially connected flip-flops. The first flip-flop (120) comprises an A flip-flop synchronized to the E signal (114). The A flip-flop generates an A reference signal (Addl Corr A) (132). Similarly, a second flip-flop B (122) generates a correlation reference signal (Addl Corr B) (134), a third flip-flop C (124) provides a C additional correlation reference signal (Addl Corr C) (136), and so on.

For instance, an l-th flip-flop (not shown) is configured to generate an l-th correlation reference signal (Addl Corr l), l is an integer less than (N+2).

Finally, an (N+2)-th flip-flop (130) generates an (N+2)-th correlation signal (Addl Corr (N+2)) (142).

In this embodiment, the computer (168) receives the accumulate and dump correlation sums of the (Addl Corr A) signal, the (Addl Corr B) signal, and the (Addl Corr C) signal which are correlated with the incoming composite signal whose direct signal component is very closely aligned in time with the Punctual signal (116). The computer uses these correlations and computes a first additional weighted correlation function:

$$W_1^* = (\text{Addl Corr B} - \text{Addl Corr C}) - (\text{Addl Corr A} - \text{Addl Corr B}).$$

As was explained above, this function $W_1^*$ (shown in FIG. 9 as signal 74) is sensitive only to multipath signals which lie in a certain multipath delay range.

Thus, we obtained the first filtering function similar to the filtering function of FIG. 7, wherein the delay D2 corresponding to the peak of the triangular filter function of FIG. 7 is determined by the delay of the Addl Ref B (134) waveform with respect to the Punctual signal (116). The left and right width of the triangle filter function of FIG. 7 are determined by the delay of the reference waveform from Addl Ref A (132) to Addl Ref B (134), and from Addl Ref B (134) to Addl Ref C (136) respectively.

Similarly, if we take waveforms Addl Ref B (134), Addl Ref C (136) and Addl Ref D (138) instead of Addl Ref A (132), Addl Ref B (134) and Addl Ref C (136), we can obtain a weighting function $W_2^*$ (shown in FIG. 9 as signal (76)) which is effectively multiplied with the incoming signal. In this case, we obtain a second triangular filter function with the delay D2 of FIG. 7 increased. Now, the peak occurs where the previous triangular filter function goes to zero on the right side of the triangle. The second filter function can be utilized to analyze a second portion of the incoming code multipath distortion signal.

If we continue taking more of these effective correlations, finally, we arrive to the N-th additional weighted correlation function $W_N^*$ formed by the waveforms Addl Corr N, Addl Corr (N+1), and Addl Corr (N+2) (142). In this case, we obtain an N-th triangular filter function with the delay D2 of FIG. 7 increased again. Again, the peak occurs where the previous (N−1)-th triangular filter function goes to zero on the right side of the triangle. The N-th filter function can be utilized to analyze an N-th portion of the incoming code multipath distortion signal.

Thus, the apparatus (100) of FIG. 14 allows one to obtain the filter components which provide the filter function shown in FIG. 6, wherein there is some overlap between different filter functions. The filter function shown in FIG. 5 could be obtained by appropriately delaying the reference waveforms $W_1^*$, $W_2^*$, etc.

In another embodiment of the present invention depicted in FIG. 15, the analyzing circuit (202) comprises an (N+2) serially connected additional flip-flops and an N dedicated hardware circuits (250, 252, . . . 254)/In this embodiment, the N dedicated hardware circuits (250, 252, . . . 254) instead of computer are used to form the first weighting function $W_1^*$, the second weighting function $W_2^*$, and so on. In this embodiment, only a single correlation sum need be read back each time from the correlation block for each filter function, wherein in the embodiment of the present invention shown in FIG. 14 all three correlation sums should be read back each time from the correlation block for each filter function. In this embodiment, the arithmetic calculations are performed in the circuits of the dedicated hardware. Thus, the circuit of FIG. 15 is faster than the circuit of FIG. 14 because the arithmetic operations can be performed in the dedicated hardware faster than the digital computations can be performed by the computer.

Taking one period of the $W_1^*$ or $W_2^*$ reference waveforms where the non-zero values exist provides an equivalent weighting function that is being imposed to obtain the filter functions. In this case, the weighting has both positive and negative values.

In general, the multipath disturbance will have both positive and negative effects on the tracking channels a function of multipath delay. The multipath analyzer disclosed in the present patent application provides a graph of that multipath disturbance as a function of multipath delay for a given location at a given time.

For different prospective sites, one can take this information over time and use it to determine which sites may be best from a multipath standpoint, given the user's GPS receiver's tracking multipath error response envelopes. One can also take the RMS (root-mean-square) of the Multipath Disturbance vs. Multipath Delay graph for a representative number of sample times at each location of interest and compare the final RMS graph. The location with the lowest RMS graph in the delay range of interest which is dependent on the tracking scheme used, will provide the best location in terms of lowest multipath given the tracking scheme for those representative times.

Not all of the additional correlators A (250), B (252), and so on, needed to provide enough filter functions to cover the 1–2 chip multipath delay range of interest, are needed for each satellite to cover all satellites in view. A single set of correlators can be time multiplexed to check a single satellite-vehicle (SV) at a time. For stationary antennas, the multipath changes slowly with time (within, say, periods of 5 minutes), and a single set of correlators can be easily time-multiplexed amongst all the satellites in view to provide many sample points within a 5 minute period.

On the other hand, for non-stationary antennas, the multipath can change much more rapidly. To obtain a more accurate measurement, one should use V sets of N analyzing blocks, wherein V is the number of satellites in the maximum network of satellites in view, rather than do time-multiplexing among less than V sets of N analyzing blocks.

Another aspect of the present invention is a method for analyzing a composite signal, wherein the composite signal includes a signal from a transmitter and an incoming distortion component.

In one embodiment, in the most general terms, the method can comprise the following steps: (a) receiving the composite signal by utilizing a tracking circuit, and (b) analyzing the incoming distortion component using an analyzing circuit.

If one analyzes the satellite composite signal having a multipath distortion component, the method comprises the following steps: (a) receiving the composite signal by utilizing a satellite tracking circuit, and (b) analyzing the incoming code multipath distortion component using an analyzing circuit.

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. An apparatus for analyzing a composite signal, wherein said composite signal includes a direct signal transmitted from at least one satellite and an incoming code multipath distortion component; said apparatus comprising:
   a satellite code channel tracking circuit configured to receive said composite signal; wherein said satellite code channel tracking circuit is configured to generate a satellite code tracking function having a tracking code multipath distortion component; wherein said satellite code channel tracking circuit further comprises:
      at least two partial code tracking circuits, wherein each said partial tracking circuit is used to minimize said tracking code multipath distortion component; wherein said minimized tracking code multipath distortion component comprises a residual tracking code multipath distortion component; and
      at least one additional estimation tracking circuit; wherein each said additional estimation circuit is used to estimate and further minimize said residual tracking code multipath distortion component; and
   an analyzing circuit connected to said satellite code channel tracking circuit; and wherein said analyzing circuit is configured to analyze said residual tracking code multipath distortion component.

2. The apparatus of claim 1; wherein at least one said partial code tracking circuits further comprises:
   a Weight tracking circuit configured to provide a satellite code tracking function having a code multipath response envelope; wherein said Weight tracking circuit is configured to generate a Weight function at a level selected from the group consisting of {an Input level, a Local Carrier reference level, a Complex Mixer circuit level, a Local Code reference level, and a Code Correlation circuit level}.

3. The apparatus of claim 1; wherein at least one said partial code tracking circuit further comprises:
   a Modify tracking circuit configured to provide a satellite code tracking function having a code multipath response envelope; wherein said Modify tracking circuit is configured to generate a Modify function at a level selected from the group consisting of {an Input level, a Local Carrier reference level, a Complex Mixer circuit level, a Local Code reference level, and a Code Correlation circuit level}.

4. The apparatus of claim 2; wherein said Weight tracking circuit further comprises:
   an (I & Q) Input Weight tracking circuit configured to process said input composite signal from said satellite and to generate an (I & Q) weighted component of an (I & Q) input composite signal.

5. The apparatus of claim 3; wherein said Modify tracking circuit further comprises:
   an (I & Q) Input Modify tracking circuit configured to process said input composite signal from said satellite and to generate an (I & Q) modified component of an (I & Q) input composite signal.

6. The apparatus of claim 2; wherein said Weight tracking circuit further comprises:
   an (I & Q) Weight Local Carrier reference circuit configured to generate an (I & Q) weighted component of an (I & Q) local carrier reference signal.

7. The apparatus of claim 3; wherein said Modify tracking circuit further comprises:
   an (I & Q) Modify Local Carrier reference circuit configured to generate an (I & Q) modified component of an (I & Q) local carrier reference signal.

8. The apparatus of claim 2; wherein said Weight tracking circuit further comprises:
   an Inphase Channel Weight Complex Mixer circuit configured to generate an (I) weighted component of a baseband sampled composite signal.

9. The apparatus of claim 3; wherein said Modify tracking circuit further comprises:
   an Inphase Channel Modify Complex Mixer circuit configured to generate an (I) modified component of a baseband sampled composite signal.

10. The apparatus of claim 2; wherein said Weight tracking satellite channel circuit further comprises:
    a Weight Local Code reference circuit configured to locally generate a Local code weighted reference signal.

11. The apparatus of claim 3; wherein said Modify tracking satellite channel circuit further comprises:
    a Modify Local Code reference circuit configured to locally generate a Local code modified reference signal.

12. The apparatus of claim 2; wherein said Weight tracking satellite channel circuit further comprises:
    a Weight Code Correlation circuit configured to generate a weighted correlation component of a composite correlation signal.

13. The apparatus of claim 3; wherein said Modify tracking satellite channel circuit further comprises:
    a Modify Code Correlation circuit configured to generate a modified correlation component of a composite correlation signal.

14. The apparatus of claim 1; wherein said additional estimation circuit further comprises:

a Weight estimation circuit configured to estimate and further minimize said residual code multipath response component, wherein said Weight estimation circuit is configured to generate a Weight function at a level selected from the group consisting of {an Input level, a Local Carrier reference level, a Complex Mixer circuit level, a Local Code reference level, and a Code Correlation circuit level}.

15. The apparatus of claim 1; wherein said additional estimation circuit further comprises:

a Modify estimation circuit configured to estimate and further minimize said residual code multipath response component, wherein said Modify estimation circuit is configured to generate a Modify function at a level selected from the group consisting of {an Input level, a Local Carrier reference level, a Complex Mixer circuit level, a Local Code reference level, and a Code Correlation circuit level}.

16. The apparatus of claim 14; wherein said Weight estimation circuit further comprises:

an (I & Q) Input Weight estimation circuit configured to generate an (I & Q) weighted estimation component of said (I & Q) input composite signal.

17. The apparatus of claim 15; wherein said Modify estimation circuit further comprises:

an (I & Q) Input Modify estimation circuit configured to generate an (I & Q) modified estimation component of said (I & Q) input composite signal.

18. The apparatus of claim 14; wherein said Weight estimation circuit further comprises:

an (I & Q) Weight Local Carrier reference estimation circuit configured to generate an (I & Q) weighted estimation component of an (I & Q) local carrier reference signal.

19. The apparatus of claim 15; wherein said Modify estimation circuit further comprises:

an (I & Q) Modify Local Carrier reference estimation circuit configured to generate an (I & Q) modified estimation component of an (I & Q) local carrier reference signal.

20. The apparatus of claim 14; wherein said Weight estimation circuit further comprises:

an Inphase Channel Weight Complex Mixer estimation circuit configured to generate an (I) weighted estimation component of a baseband sampled composite signal.

21. The apparatus of claim 15; wherein said Modify estimation tracking circuit further comprises:

an Inphase Channel Modify Complex Mixer estimation circuit configured to generate an (I) modified estimation component of a baseband sampled composite signal.

22. The apparatus of claim 14; wherein said Weight estimation satellite channel circuit further comprises:

a Weight Local Code reference estimation circuit configured to locally generate a Local code weighted estimation reference signal.

23. The apparatus of claim 15; wherein said Modify estimation satellite channel circuit further comprises:

a Modify Local Code estimation reference circuit configured to locally generate a Local code modified estimation reference signal.

24. The apparatus of claim 14; wherein said Weight estimation satellite channel circuit further comprises:

a Weight Code Correlation estimation circuit configured to generate a weighted correlation estimation component of a composite correlation signal.

25. The apparatus of claim 15; wherein said Modify estimation satellite channel circuit further comprises:

a Modify Code Correlation estimation circuit configured to generate a modified correlation estimation component of a composite correlation signal.

26. The apparatus of claim 1; wherein said analyzing circuit further comprises:

a plurality of N analyzing circuits, N being an integer; and wherein said incoming code multipath distortion component comprises N portions of said incoming code multipath distortion component.

27. A apparatus for analyzing a composite signal, wherein said composite signal includes a direct signal transmitted from at least one satellite and at least N portions of said incoming code multipath distortion component; N being an integer; said apparatus comprising:

a satellite code channel broad correlator tracking circuit configured to receive said composite signal; wherein said satellite code channel broad correlator tracking circuit further comprises:

a code NCO & Generator block configured to generate a local code signal;

an Early (E) flip-flop connected to said code NCO & Generator block, wherein said E flip-flop is configured to generate an Early (E) signal;

a Punctual (P) flip-flop connected to said E flip-flop, wherein said P flip-flop is configured to generate a Punctual (P) signal; and a Late (L) flip-flop connected to said P flip-flop, wherein said L flip-flop is configured to generate a Late (L) signal; and a plurality of N analyzing circuits, N being an integer; and wherein said plurality of N analyzing circuits further comprises:

(N+2) serially connected additional flip-flops;

wherein a first additional flip-flop comprises an A flip-flop connected to said E flip-flop, and wherein said A flip-flop is configured to generate an A additional correlation reference signal (Addl Corr A);

wherein a second additional flip-flop comprises a B flip-flop connected to said A flip-flop, wherein said B flip-flop is configured to generate a B additional correlation reference signal (Addl Corr B);

wherein a third additional flip-flop comprises a C flip-flop connected to said B flip-flop, wherein said C flip-flop is configured to generate a C additional correlation reference signal (Addl Corr C);

wherein a fourth additional flip-flop comprises a D flip-flop connected to said C flip-flop, wherein said D flip-flop is configured to generate a D additional correlation reference signal (Addl Corr D);

wherein an l-th additional flip-flop is connected to an (l−1)-th flip-flop and is connected to an (l+1)-th flip-flop, and wherein said l-th flip-flop is configured to generate an l-th additional correlation reference signal (Addl Corr l); l being an integer greater than 4 and less than (N+2);

and wherein an (N+2)-th additional flip-flop is connected to a (N+1)-th flip-flop, wherein said (N+2)-th flip-flop is configured to generate an (N+2)-th additional correlation signal (Addl Corr (N+2));

and wherein said (Addl Corr A) signal, said (Addl Corr B) signal, and said (Addl Corr C) signal are used by a computer to form a first additional weighted correlation function $W_1^*$ that is utilized to analyze a first portion of said incoming code multipath distortion signal;

and wherein said (Addl Corr B) signal, said (Addl Corr C) signal, and said (Addl Corr D) signal are used by said computer to form a second additional weighted correlation function $W_2^*$ that is utilized to analyze a second portion of said incoming code multipath distortion signal;

and wherein said (Addl Corr l) signal, said (Addl Corr (l+1)) signal, and said (Addl Corr (l+2)) signal are used by said computer to form an l-th additional weighted correlation function $W_l^*$ that is utilized to analyze an l-th portion of said incoming code multipath distortion signal;

and wherein said (Addl Corr N) signal, said (Addl Corr (N+1)) signal, and said (Addl Corr N+2)) signal are used by said computer to form an N-th additional weighted correlation function $W_N^*$ that is utilized to analyze an N-th portion of said incoming code multipath distortion signal.

28. An apparatus for analyzing a composite signal, wherein said composite signal includes a direct signal transmitted from at least one satellite and at least N portions of said incoming code multipath distortion component; N being an integer; said apparatus comprising:

a satellite code channel broad correlator tracking circuit configured to receive said composite signal; wherein said satellite code channel broad correlator tracking circuit further comprises:
  a code NCO & Generator block configured to generate a local code signal;
  an Early (E) flip-flop connected to said code NCO & Generator block, wherein said E flip-flop is configured to generate an Early (E) signal;
  a Punctual (P) flip-flop connected to said E flip-flop, wherein said P flip-flop is configured to generate a Punctual (P) signal; and
  a Late (L) flip-flop connected to said P flip-flop, wherein said L flip-flop is configured to generate a Late (L) signal; and a plurality of N analyzing circuits, N being an integer; and wherein said plurality of N analyzing circuits further comprises:
  an (N+2) serially connected additional flip-flops; and
  an N dedicated hardware circuits;

wherein a first additional flip-flop comprises an A flip-flop connected to said E flip-flop, and wherein said A flip-flop is configured to generate an A additional correlation reference signal (Addl Corr A);

wherein a second additional flip-flop comprises a B flip-flop connected to said A flip-flop, wherein said B flip-flop is configured to generate a B additional correlation reference signal (Addl Corr B);

wherein a third additional flip-flop comprises a C flip-flop connected to said B flip-flop, wherein said C flip-flop is configured to generate a C additional correlation reference signal (Addl Corr C);

wherein a fourth additional flip-flop comprises a D flip-flop connected to said C flip-flop, wherein said D flip-flop is configured to generate a D additional correlation reference signal (Addl Corr D);

wherein an l-th additional flip-flop is connected to an (l−1)-th flip-flop and connected to an (l+1)-th flip-flop, wherein said l-th flip-flop is configured to generate an l-th additional correlation reference signal (Addl Corr l); l being an integer greater than 4 and less than (N+2);

and wherein an (N+2)-th additional flip-flop is connected to an (N+1)-th flip-flop, wherein said (N+2)-th flip-flop is configured to generate an (N+2)-th additional correlation reference signal (Addl Corr (N+2));

and wherein said (Addl Corr A) signal, said (Addl Corr B) signal, and said (Addl Corr C) signal are used by a first dedicated hardware circuit to form a first additional weighted correlation function $W_1^*$ that is utilized to analyze a first portion of said incoming code multipath distortion signal;

and wherein said (Addl Corr B) signal, said (Addl Corr C) signal, and said (Addl Corr D) signal are used by a second dedicated hardware circuit computer to form a second additional weighted correlation function $W_2^*$ that is utilized to analyze a second portion of said incoming code multipath distortion signal;

and wherein said (Addl Corr l) signal, said (Addl Corr (l+1)) signal, and said (Addl Corr (l+2)) signal are used by an l-th dedicated hardware circuit computer to form an l-th additional weighted correlation function $W_l^*$ that is utilized to analyze an l-th portion of said incoming code multipath distortion signal;

and wherein said (Addl Corr N) signal, said (Addl Corr (N+1)) signal, and said (Addl Corr (N+2)) signal are used by an N-th dedicated hardware circuit to form an N-th additional weighted correlation function $W_N^*$ that is utilized to analyze an N-th portion of said incoming code multipath distortion signal.

* * * * *